(12) United States Patent
Zhang et al.

(10) Patent No.: US 9,072,064 B2
(45) Date of Patent: Jun. 30, 2015

(54) METHOD FOR PERFORMING POWER HEADROOM REPORTING PROCEDURE AND PHR MAC CONTROL ELEMENT

(71) Applicant: SUNPLUS TECHNOLOGY CO., LTD., Hsinchu (TW)

(72) Inventors: Yuanyuan Zhang, Beijing (CN); Tsung-Liang Lu, Taipei (TW)

(73) Assignee: SUNPLUS TECHNOLOGY CO., LTD., Hsinchu (TW)

( * ) Notice: Subject to any disclaimer, the term of this patent is extended or adjusted under 35 U.S.C. 154(b) by 186 days.

(21) Appl. No.: 13/951,669

(22) Filed: Jul. 26, 2013

(65) Prior Publication Data

US 2013/0315167 A1    Nov. 28, 2013

Related U.S. Application Data

(63) Continuation of application No. 13/080,243, filed on Apr. 5, 2011, now Pat. No. 8,537,767.

(60) Provisional application No. 61/410,655, filed on Nov. 5, 2010, provisional application No. 61/344,237, filed on Jun. 17, 2010, provisional application No. 61/282,813, filed on Apr. 6, 2010.

(51) Int. Cl.
| | |
|---|---|
| *H04W 4/00* | (2009.01) |
| *H04W 52/36* | (2009.01) |
| *H04W 72/04* | (2009.01) |
| *H04W 52/04* | (2009.01) |
| *H04W 52/24* | (2009.01) |
| *H04W 52/40* | (2009.01) |

(52) U.S. Cl.
CPC ............ *H04W 52/365* (2013.01); *H04W 72/04* (2013.01); *H04W 52/04* (2013.01); *H04W 52/242* (2013.01); *H04W 52/40* (2013.01)

(58) Field of Classification Search
CPC ............ H04W 52/226; H04W 52/228; H04W 52/242; H04W 52/365; H04W 52/367; H04W 52/04–52/14; H04W 72/04; H04W 72/06; H04W 72/08; H04W 72/10; H04W 72/12; H04W 72/14; Y02B 60/50
USPC .......................... 370/252–468; 455/450–455
See application file for complete search history.

(56) References Cited

U.S. PATENT DOCUMENTS

| | | | |
|---|---|---|---|
| 8,223,708 B2 | 7/2012 | Guo | |
| 2009/0303954 A1 | 12/2009 | Guo | |
| 2010/0238830 A1* | 9/2010 | Kim et al. ...................... | 370/252 |
| 2010/0273515 A1* | 10/2010 | Fabien et al. .................. | 455/509 |
| 2010/0296470 A1* | 11/2010 | Heo et al. ...................... | 370/329 |
| 2010/0296471 A1 | 11/2010 | Heo et al. | |
| 2010/0329204 A1* | 12/2010 | Guo et al. ...................... | 370/329 |
| 2011/0080838 A1* | 4/2011 | Larsson et al. ................ | 370/252 |
| 2011/0080881 A1 | 4/2011 | Hsu | |
| 2012/0057547 A1 | 3/2012 | Lohr et al. | |
| 2013/0010720 A1* | 1/2013 | Lohr et al. .................... | 370/329 |

* cited by examiner

*Primary Examiner* — Afsar M Qureshi
(74) *Attorney, Agent, or Firm* — WPAT, PC; Justin King

(57) ABSTRACT

This invention relates to a method for performing Power Headroom reporting procedure, adapted for a user equipment, wherein the user equipment is operated in a plurality of activated serving cells, the method includes the steps of: providing a prohibitPHR-Timer; obtaining a plurality of downlink path loss values respectively corresponding to the activated serving cells; triggering a power headroom report when the prohibitPHR-Timer expires or has expired and at least one of the downlink path loss values has changed more than a PathlossChange threshold since the last transmission of a PHR; and reporting the power headroom report.

19 Claims, 22 Drawing Sheets

| C7 | C6 | C5 | C4 | C3 | C2 | C1 | R |
|---|---|---|---|---|---|---|---|
| R | R | \multicolumn{6}{c}{PH (Type 2, PCell)} | |
| R | R | \multicolumn{6}{c}{$P_{CMAX,c}$ 1} | |
| R | R | \multicolumn{6}{c}{PH (Type 1, PCell)} | |
| R | R | \multicolumn{6}{c}{$P_{CMAX,c}$ 2} | |
| R | R | \multicolumn{6}{c}{PH (Type 1, SCell)} | |
| R | R | \multicolumn{6}{c}{$P_{CMAX,c}$ (SCell)} | |
| R | R | \multicolumn{6}{c}{PH (Type 1, SCell)} | |
| R | R | \multicolumn{6}{c}{$P_{CMAX,c}$ (SCell)} | |
| R | R | \multicolumn{6}{c}{PH (Type 1, SCell)} | |
| R | R | \multicolumn{6}{c}{$P_{CMAX,c}$ (SCell)} | |

FIG. 22

| | C7 | C6 | C5 | C4 | C3 | C2 | C1 | R | |
|---|---|---|---|---|---|---|---|---|---|
| 2310 → | | | | | | | | | |
| 2325 → | R | 0 | PH (Type 2, PCell) | | | | | | ← 2320 |
| | R | R | $P_{CMAX,c}$ 1 | | | | | | ← 2321 |
| 2335 → | R | 1 | PH (Type 1, PCell) | | | | | | ← 2330 |
| 2345 → | R | 0 | PH (Type 1, SCell) | | | | | | ← 2340 |
| | R | R | $P_{CMAX,c}$ (SCell) | | | | | | ← 2371 |
| 2355 → | R | 1 | PH (Type 1, SCell) | | | | | | ← 2350 |
| 2365 → | R | 1 | PH (Type 1, SCell) | | | | | | ← 2360 |

METHOD FOR PERFORMING POWER HEADROOM REPORTING PROCEDURE AND PHR MAC CONTROL ELEMENT

This application is a continuation of U.S. patent application Ser. No. 13/080,243, filed on Apr. 5, 2011, which claims the benefit of U.S. Provisional Application No. 61/282,813 filed on Apr. 6, 2010, U.S. Provisional Application No. 61/344,237 filed on Jun. 17, 2010 and U.S. Provisional Application No. 61/410,655 filed on Nov. 5, 2010, the content of which is hereby incorporated by reference.

BACKGROUND OF THE INVENTION

1. Field of Invention

The present invention relates in general to a Power Headroom reporting mechanism, and more particularly to a Power Headroom reporting mechanism for radio resources allocation in a wireless communication system.

2. Related Art

In a wireless communication system, how to efficiently distribute/allocate uplink transmission resources between multiple user equipments (UEs) is always a critical issue from the system point of view. In order to achieve better radio resource management, some mechanisms which is used for enabling UEs to provide related information and informing the network side of some UE-specific power status, are usually introduced in the wireless communication system. For example, procedures called Power Headroom reporting are introduced in the 3rd Generation Partnership Project (3GPP) Universal Terrestrial Radio Access (UTRA) system and Evolved UTRA (E-UTRA) system. Also a mechanism called Power Status Reporting is introduced in IEEE 802.16m.

Taking the Power Headroom reporting procedure in 3GPP E-UTRA for example, the Power Headroom is the difference between the nominal UE maximum transmit power and the estimated power for UpLink-Shared Channel (UL-SCH) transmission. And the reporting procedure is introduced to report the difference to the network side, so that the network entity (eNB) can perform radio resource management in an appropriate way. This is especially important when allocating the transmission format (bandwidth and modulation and coding scheme) to different UEs. The network entity (eNB) can use the Power Headroom value to determine how much more uplink bandwidth per subframe which a UE is capable of using. This can help to avoid allocating uplink transmission resources to UEs which are unable to use them, thus a Signal to Interference-plus-Noise Ratio (SINR) is decreased and the system capacity may be wasted.

The behavior of the Power Headroom reporting procedure is defined in 3GPP protocol specifications. In the 3GPP protocol specifications, a Power Headroom Report (PHR) shall be triggered if any of the following events occur:

prohibitPHR-Timer expires or has expired and the path loss has changed more than dl-PathlossChange dB since the last transmission of a PHR when the UE has uplink resources for a new transmission, wherein only one component carrier is operated by the above-mentioned UE, and the above-mentioned path loss belongs to the component carrier of the UE.

periodicPHR-Timer expires; and upon configuration or reconfiguration of the power headroom reporting functionality by upper layers, which is not used to disable the function.

A possible implementation example of the above described PHR triggering mechanism in the 3GPP protocol specifications is illustrated in FIG. 1. FIG. 1 is a flowchart of a conventional PHR triggering method according to the 3GPP specifications. However, the triggered PHR is only for one component carrier.

In the 3GPP protocol specifications, it is also read a Power headroom reporting procedure to enable the UE to transmit the PHR to the network side. FIG. 2 illustrates a flowchart of a conventional Power headroom reporting method according to the 3GPP specifications. Referring to FIG. 2, the method includes the following steps.

In step S201, the method for reporting a PHR starts.

In step S202, it is determined whether the UE has uplink (UL) resources allocated for a new transmission for the present Transmission Time Interval (TTI).

In step S203, it is determined whether it is the first uplink (UL) resource for the new transmission since the last Medium Access Control (MAC) reset.

In step S204, a periodicPHR-Timer is started.

In step S205, it is determined whether the PHR has been triggered since the last transmission of a PHR or whether it is the first time that a PHR is triggered.

In step S206, it is determined whether the allocated uplink (UL) resources can accommodate a PHR MAC control element plus its sub-header after the logical channel prioritization.

In step S207, the value of the power headroom is obtained from the physical layer.

In step S208, the multiplexing and assembly procedure are instructed to generate and transmit a PHR MAC control element based on the value reported by the physical layer.

In step S209, the periodicPHR-Timer is started or restarted.

In step S210, a prohibitPHR-Timer is started or restarted.

In step S211, all triggered PHR(s) is/are cancelled.

In step S212, the method for reporting a PHR ends.

The above PHR triggering and reporting mechanisms are designed for release 8 and release 9 (Rel-8/Rel-9) 3GPP E-UTRA system, which is commonly known as 3GPP Long Term Evolution (LTE), but as new features are introduced in the future release system, which is commonly known as 3GPP LTE-Advanced, the PHR triggering and reporting mechanisms defined in Rel-8/Rel-9 may be insufficient. For example, the UE may be configured with simultaneous transmission of Physical Uplink Control CHannel (PUCCH) and Physical Uplink Shared CHannel (PUSCH) on the same carrier in LTE-Advanced, while no such simultaneous transmission is supported in Rel-8/Rel-9 E-UTRA system. Another newly introduced feature for LTE-Advanced is the Carrier Aggregation (CA). A UE with reception and/or transmission capabilities for CA can simultaneously receive and/or transmit on multiple component carriers (CC) corresponding to multiple serving cells. The introduction of transmission on multiple component carriers may also bring the need of new PHR mechanism.

SUMMARY OF THE INVENTION

It is therefore a first objective of the present invention to provide a method for performing Power Headroom reporting procedure, so that the eNB can completely obtain the information of PHR for activated serving cells.

It is therefore a second objective of the present invention to provide a method for performing Power Headroom reporting procedure, so that a type 1 power headroom and a type 2 power headroom will be reported when simultaneous transmission of the Physical Uplink Control CHannel (PUCCH) and Physical Uplink Shared CHannel (PUSCH) is configured.

It is therefore a third objective of the present invention to provide a PHR media access control (MAC)-control element, so as to report a type 1 power headroom and a type 2 power headroom.

It is therefore a fourth objective of the present invention to provide a PHR MAC control element, so as to report PHR for multiple serving cells.

In order to achieve the abovementioned first object of the present invention and other object of the present invention, a method for performing Power Headroom reporting procedure is provided in the present invention, wherein a user equipment is operated in a plurality of activated serving cells. The method comprises the steps of: providing a prohibitPHR-Timer; determining whether the user equipment has uplink resources for new transmission; when the user equipment has uplink resources for new transmission, the method further comprising: triggering a power headroom report when the prohibitPHR-Timer expires or has expired and at least one of a plurality of downlink path loss values has changed more than a PathlossChange threshold since the last transmission of a previous power headroom report, wherein the downlink path loss values respectively corresponding to the serving cells; and reporting the power headroom report.

In order to achieve the abovementioned second object of the present invention and other object of the present invention, a method for performing Power Headroom reporting procedure in a user equipment, wherein the user equipment is configured with simultaneous transmission of a physical uplink control channel and a physical uplink shared channel, a power headroom report comprising a type 1 power headroom and a type 2 power headroom. The method comprises the steps of: determining whether the user equipment has uplink resources for new transmission; when the user equipment has uplink resources for new transmission, determining whether the power headroom report has been triggered; and when the power headroom report has been triggered, transmitting the type 1 power headroom and the type 2 power headroom together.

In order to achieve the abovementioned third object of the present invention and other object of the present invention, a power headroom report media access control-control element is provided in the present invention. The power headroom report media access control-control element comprises a type 2 power headroom field and a type 1 power headroom field. The type 2 power headroom field is used for indicating a type 2 power headroom level, wherein the type 2 power headroom level is obtained from a quantized value of a type 2 power headroom, wherein the type 2 power headroom is determined by a physical uplink shared channel power and a physical uplink control channel power of the primary cell. The type 1 power headroom field is used for indicating a type 1 power headroom level wherein the type 1 power headroom level is obtained from a quantized value of a type 1 power headroom, wherein the type 1 power headroom is determined by the physical uplink shared channel power of the primary cell. The power headroom report media access control-control element is used for reporting the type 1 power headroom level and the type 2 power headroom level to a network node.

In order to achieve the abovementioned fourth object of the present invention and other object of the present invention, a power headroom report media access control-control element is provided in the present invention. The power headroom report media access control-control element comprises a Ci field and a plurality of power headroom fields. The Ci field is used for indicating whether each power headroom field of its corresponding activated serving cell is reported. Each power headroom field indicates a power headroom level of the corresponding activated serving cells. The power headroom report media access control-control element is used for reporting each power headroom level of the corresponding activated serving cells to a network node.

In the present invention, since the PHR is triggered and reported for all activated serving cells, the complete information of PHR for serving cells can be obtained by the eNB. When simultaneous transmission of Physical Uplink Control CHannel (PUCCH) and Physical Uplink Shared CHannel (PUSCH) on the same carrier is configured, the type 2 power headroom can be also transmitted with the type 1 power headroom so that the eNB can correctly allocate the resources to the user equipment according to the transmitted type 1 and type 2 PHR information. In the other respect of the present invention, a PHR MAC control element is provided to carry the PHR information to the eNB so that the eNB can adaptively allocate the resources to the user equipment and the communication quality is improved.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 22 illustrates an implementation of a PHR MAC control element according to an embodiment of the present invention.

FIG. 23 illustrates an implementation of a PHR MAC control element according to an embodiment of the present invention.

DETAILED DESCRIPTION OF THE INVENTION

The present invention will be apparent from the following detailed description, which proceeds with reference to the accompanying drawings, wherein the same references relate to the same elements.

The conventional PHR triggering and reporting procedures are designed for a system which only supports single carrier deployment. But as the introduction of multi-carrier deployment has gradually become the trend of future wireless communication design, the PHR triggering/reporting for UEs supporting multi-carrier transmission would require further consideration. In this invention, different embodiments for possible scenarios are provided The First Embodiment In uplink transmission, a UE transmits a Power Headroom Report (PHR) to an E-UTRAN NodeB (eNB) in order to assist with uplink scheduling. The eNB uses the information of the PHR when it determines the amount of resources, proper modulation and coding scheme (MCS) level for physical uplink shared channel (PUSCH) transmissions. In the embodiment, the UE is operated in a multi-carrier system and performs transmission/reception in a plurality of activated serving cells. Thus, the eNB needs the information of the PHR of each activated serving cell. Besides, it is assumed that the UE is operated in 3GPP LTE-Advanced system.

Figure 1:
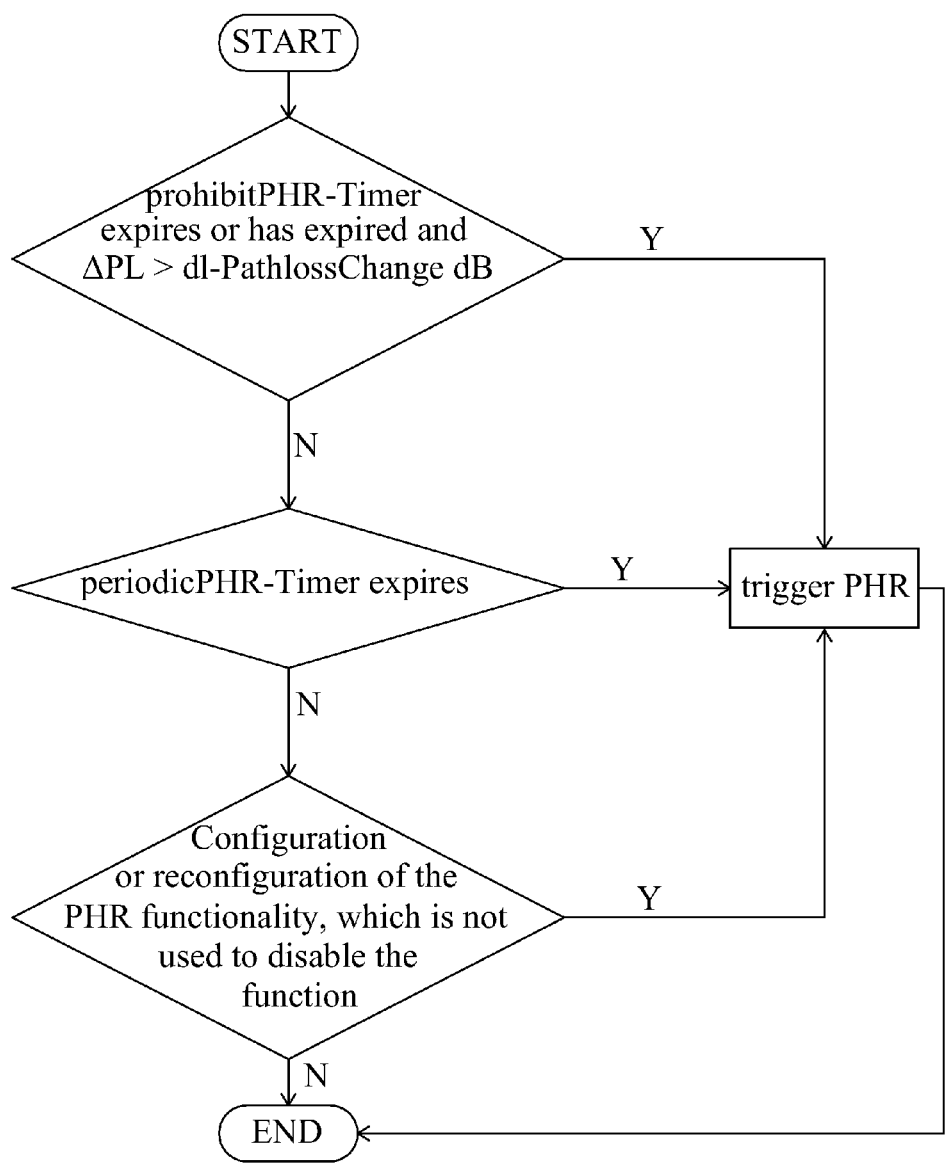
FIG. 1 illustrates a flowchart of a conventional PHR triggering method according to the 3GPP specifications.
Figure 2:
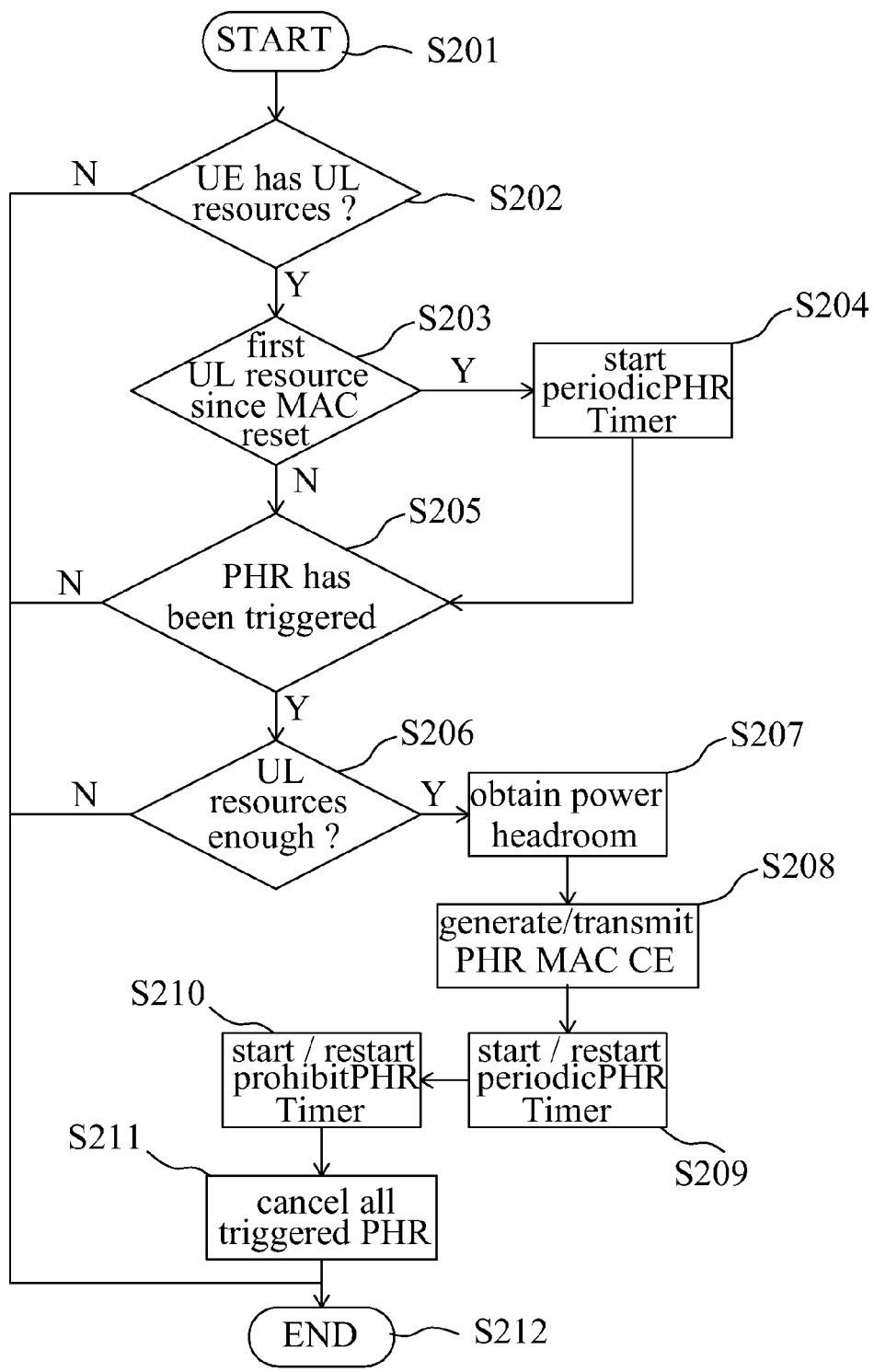
FIG. 2 illustrates a flowchart of a conventional Power headroom reporting method according to the 3GPP specifications.
Figure 3:
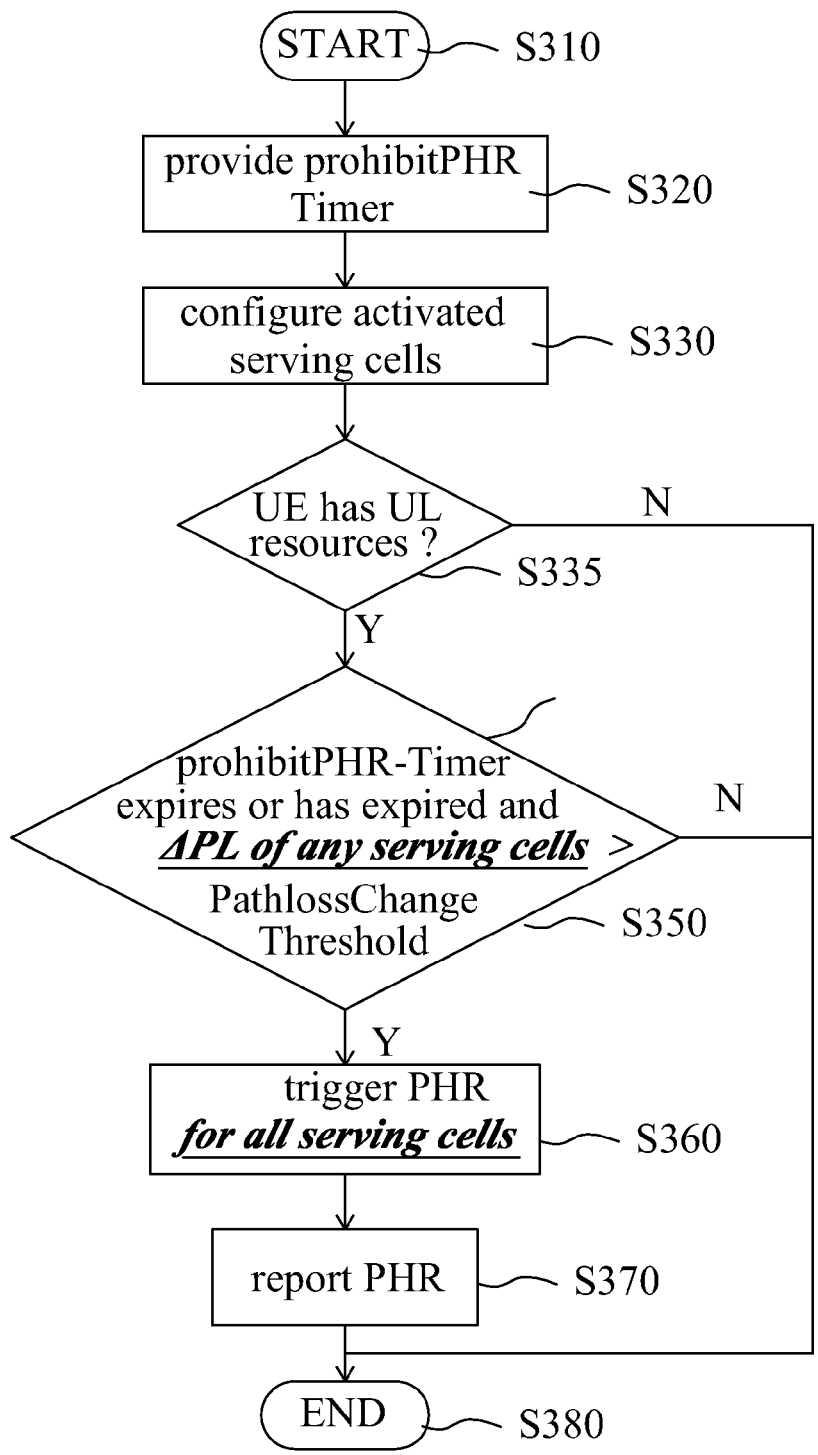
FIG. 3 illustrates a flowchart of a method for performing Power Headroom reporting procedure according to an embodiment of the present invention.

Please refer to FIG. 3 which illustrates a flowchart of a method for performing Power Headroom reporting procedure according to an embodiment of the present invention. A method for performing Power Headroom reporting procedure comprises following steps.

In step S310, the method for performing a Power Headroom reporting procedure starts.

In step S320, a prohibitPHR-Timer is provided.

In step S330, a plurality of serving cells is configured. In multi-carrier system, the UE has multiple serving cells configured, but not all of serving cells can be operated by the UE and only a set of the configured serving cells are activated. In the embodiment, a plurality of activated serving cells is allocated to the UE.

In step S335, it is determined whether the UE has uplink (UL) resource for new transmission.

In step S350, it is determined whether the prohibitPHR-Timer expires or expired and at least one of the downlink path loss values is changed ($\Delta$PL) more than a PathlossChange threshold since the last transmission of the previous PHR. In the embodiment, every activated serving cell corresponds to one downlink path loss value, and a plurality of downlink path loss (PL) values corresponding to the activated serving cells can be obtained from a physical layer. Since downlink path loss relates to uplink path loss, downlink path loss values are used for a criterion of PHR triggering. In the step S350, each downlink path loss value is examined to determine the derivation thereof is larger than the PathlossChange threshold.

In step S360, the PHR is triggered, when the prohibitPHR-Timer expires or has expired and at least one of the downlink path loss values has changed more than the PathlossChange threshold since the last transmission of the previous PHR. In the embodiment, the PHR includes a plurality of power headrooms respectively corresponding to activated serving cells, thus, the triggered PHR is for all activated serving cells.

In step S370, the PHR is reported with a granted uplink resources for new transmission.

In step S380, the method for performing a Power Headroom reporting procedure ends.

According to the abovementioned steps, the PHR of each activated serving cell is triggered and reported so that the E-UTRAN NodeB (eNB) can obtain the complete PHR information.

The Second Embodiment

In the embodiment, the UE is similarly operated in a multi-carrier system and performs transmission/reception in a plurality of activated serving cells. Besides, it is assumed that the UE is operated in 3GPP LTE-Advanced system. For conveniently describing the second embodiment, the method of performing Power Headroom reporting procedure is divided into a triggering PHR process and a reporting PHR process respectively illustrated in FIG. 4 and FIG. 6. Please refer to FIG. 4 which illustrates a flowchart of the triggering PHR process according to an embodiment of the present invention in advance. The triggering PHR process comprises following steps.

In step S410, the process for triggering the PHR starts.

Figure 5:
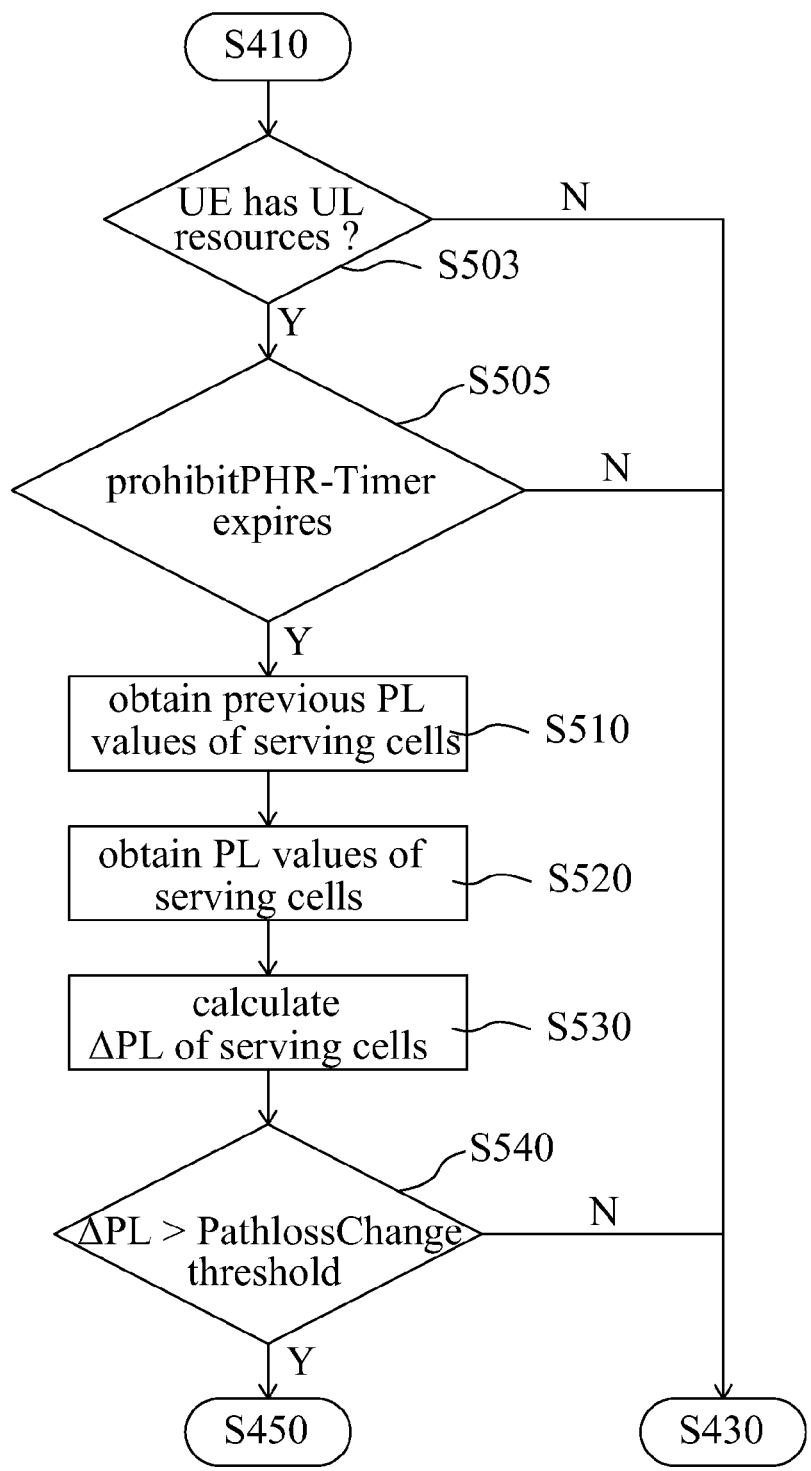
FIG. 5 illustrates a flowchart describing the sub-steps of the step S420 according to an embodiment of the present invention.

In step S420, it is determined whether a prohibitPHR-Timer expires or has expired and at least one of the downlink path loss values is changed ($\Delta$PL) more than a PathlossChange threshold since the last transmission of the previous PHR when the UE has uplink resources for new transmission. In the embodiment, every activated serving cell corresponds to one downlink path loss value, and each downlink path loss value is examined to determine the derivation thereof is larger than the PathlossChange threshold. The step S420 in this embodiment further includes several sub-steps showing in FIG. 5. Please referring to FIG. 5, the step S420 includes the steps as follow.

In step S503, it is determined whether the UE has uplink (UL) resources for new transmission.

In step S505, it is determined whether the prohibitPHR-Timer expires or has expired. Although the step S505 follows the steps S503, people having ordinary skill in the art should know that the step S503 can also follows the steps S505. Therefore, the present invention is not restricted thereto.

In step S510, a plurality of previous downlink path loss (PL) values corresponding to the activated serving cells are obtained at the last transmission of the previous PHR.

In step S520, a plurality of downlink path loss (PL) values corresponding to the activated serving cells are obtained when the UE has uplink resources for new transmission.

In step S530, a plurality of deviations (ΔPL) between the downlink path loss values and the previous downlink path loss values corresponding to the activated serving cells are respectively calculated.

In step S540, it is determined whether the deviations (ΔPL) of each activated serving cell are larger than the Pathloss-Change threshold. If one of the deviations of a corresponding activated serving cell thereof is larger than the Pathloss-Change threshold, the step S450 is performed. On the contrary, if none of the deviations is larger than the Pathloss-Change threshold, the step S430 is performed.

If the UE suffers severe interferences, the path loss values will change frequently. The prohibitPHR-Timer is used for preventing the PHR from being continuously triggered when the path loss values changes frequently. Moreover, the length of the prohibitPHR-Timer can be previously configured by radio resource control (RRC) or defined in specification.

Figure 4:
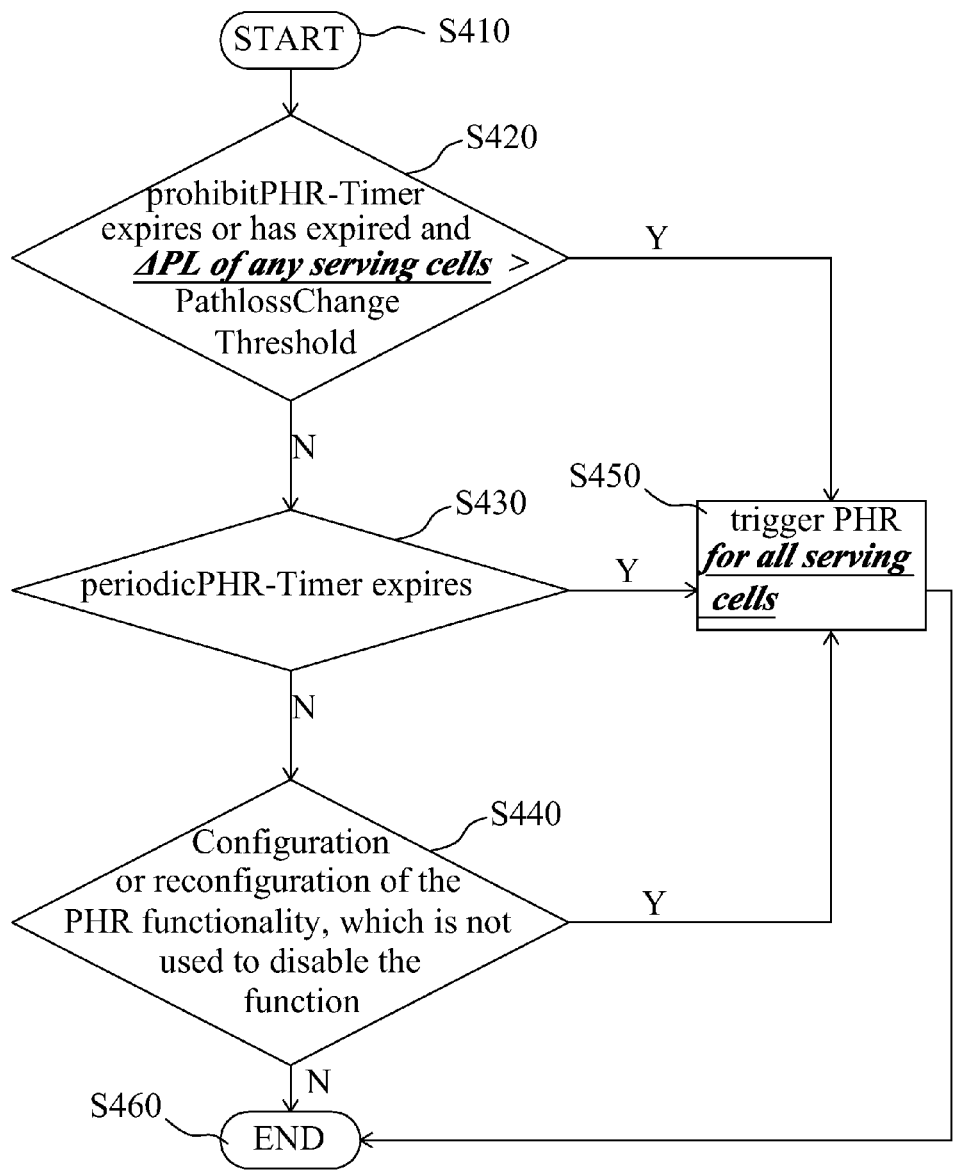
FIG. 4 illustrates a flowchart for triggering power headroom report (PHR) process according to an embodiment of the present invention.

Please refer to FIG. 4.

In step S430, it is determined whether a periodicPHR-Timer expires.

In step S440, it is determined whether the PHR functionality is configured or reconfigured by upper layers. The configured/reconfigured PHR functionality in step S440 doesn't include the function which is used to disable the PHR mechanism.

In step S450, the PHR is triggered for all activated serving cells.

In step S460, the process for triggering the PHR ends.

According to the description above, the PHR shall be triggered if any of the above three conditions occurs, wherein the three conditions comprises:

1. the prohibitPHR-Timer expires or has expired and at least one of the downlink path loss has changed more than the PathlossChange threshold since the last transmission of the previous PHR when UE has uplink resources for new transmission;
2. the periodicPHR-Timer expires;
3. the PHR functionality is configured or reconfigured by upper layers.

However, people having ordinary skill in the art should know that there are more conditions that the PHR would be triggered. The conditions for triggering the PHR may further comprise the event when the activation status of the activated serving cells is changed. Thus, the present invention is not restricted thereto.

Figure 6:
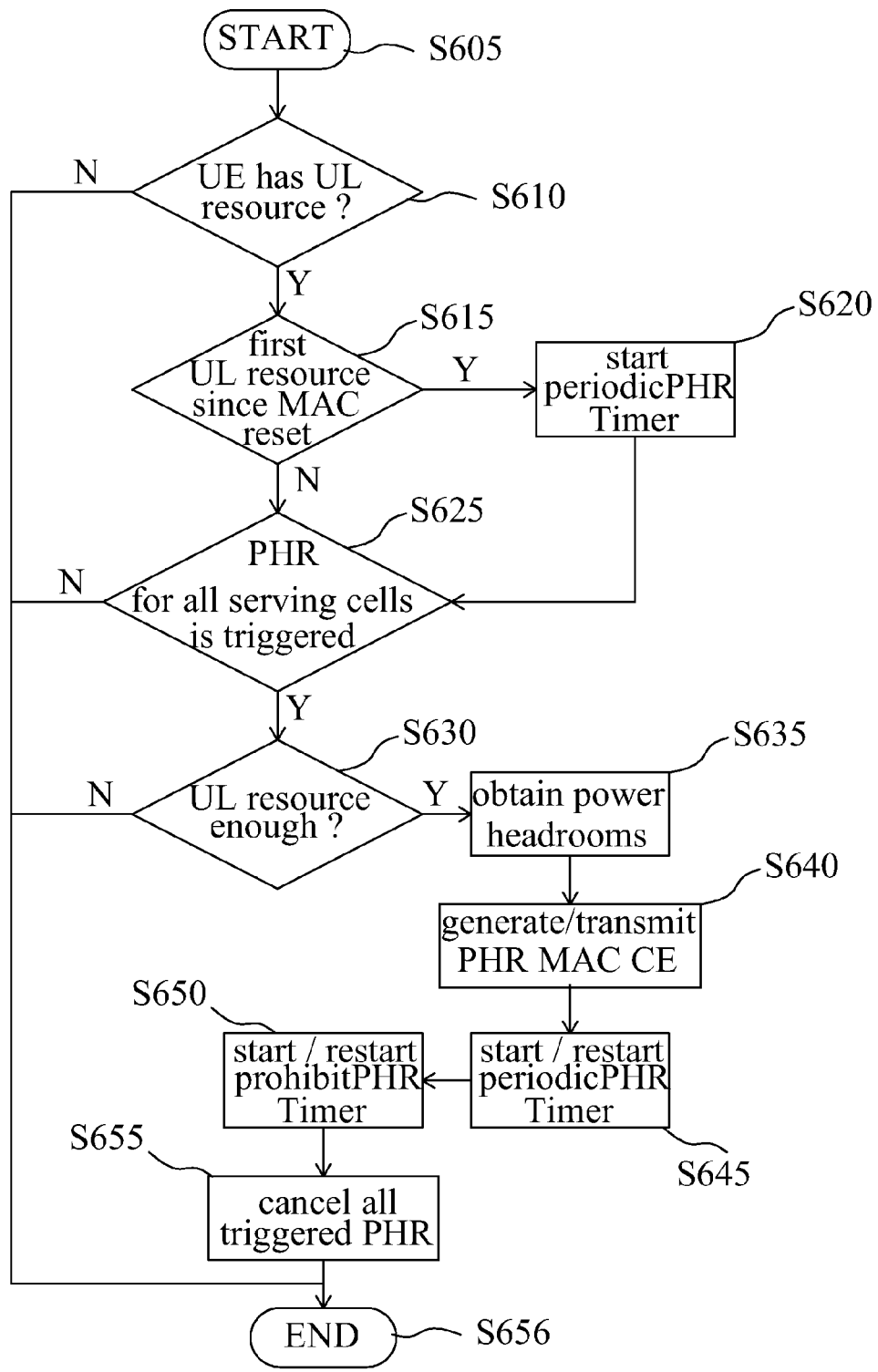
FIG. 6 illustrates a flowchart for reporting PHR process according to an embodiment of the present invention.

Please refer to FIG. 6 which illustrates a flowchart of the reporting PHR process according to an embodiment of the present invention. The reporting PHR process comprises following steps.

In step S605, the process for reporting the PHR starts.

In step S610, it is determined whether the UE has uplink (UL) resources for new transmission.

In step S615, it is determined whether this is the first uplink (UL) resource for new transmission since the last Medium Access Control (MAC) reset.

In step S620, the periodicPHR-Timer is started.

In step S625, it is determined whether the PHR has been triggered since the last transmission of the previous PHR or whether it is the first time that the PHR is triggered, wherein the PHR is for all activated serving cells.

In step S630, it is determined whether the uplink (UL) resources are capable of accommodating a PHR Medium Access Control (MAC) control element plus a sub-header thereof. In the embodiment, the PHR comprises a plurality of power headrooms corresponding to the activated serving cells, and the power headroom values are carried by the PHR MAC control element. Especially, the step S630 is determined after the logical channel prioritization, wherein the logical channel prioritization has already described in 3GPP TS 36.321 specification. The detail description thereof is omitted.

In step S635, the power headroom values corresponding to the activated serving cells are obtained from a physical layer.

In step S640, the multiplexing and assembly procedure are instructed to generate and transmit the PHR MAC control element according to the power headroom values.

In step S645, the periodicPHR-Timer is started or restarted.

In step S650, the prohibitPHR-Timer is started or restarted.

In step S655, the triggered PHR(s) is/are cancelled. The PHR may be triggered plural of times before the PHR transmission. For example, the periodicPHR-Timer expires, the prohibitPHR-Timer expires and ΔPL is larger than the threshold since the last transmission of the previous PHR. If the above situations occur and UE dose not have uplink resources for new transmission or UE does not have enough uplink resources for new transmission to accommodate the PHR Medium Access Control (MAC) control element plus the sub-header, the PHR would be triggered plural of times. In this step S655, the all triggered PHRs would be canceled.

In step S656, the process for reporting the PHR ends.

Figure 7:
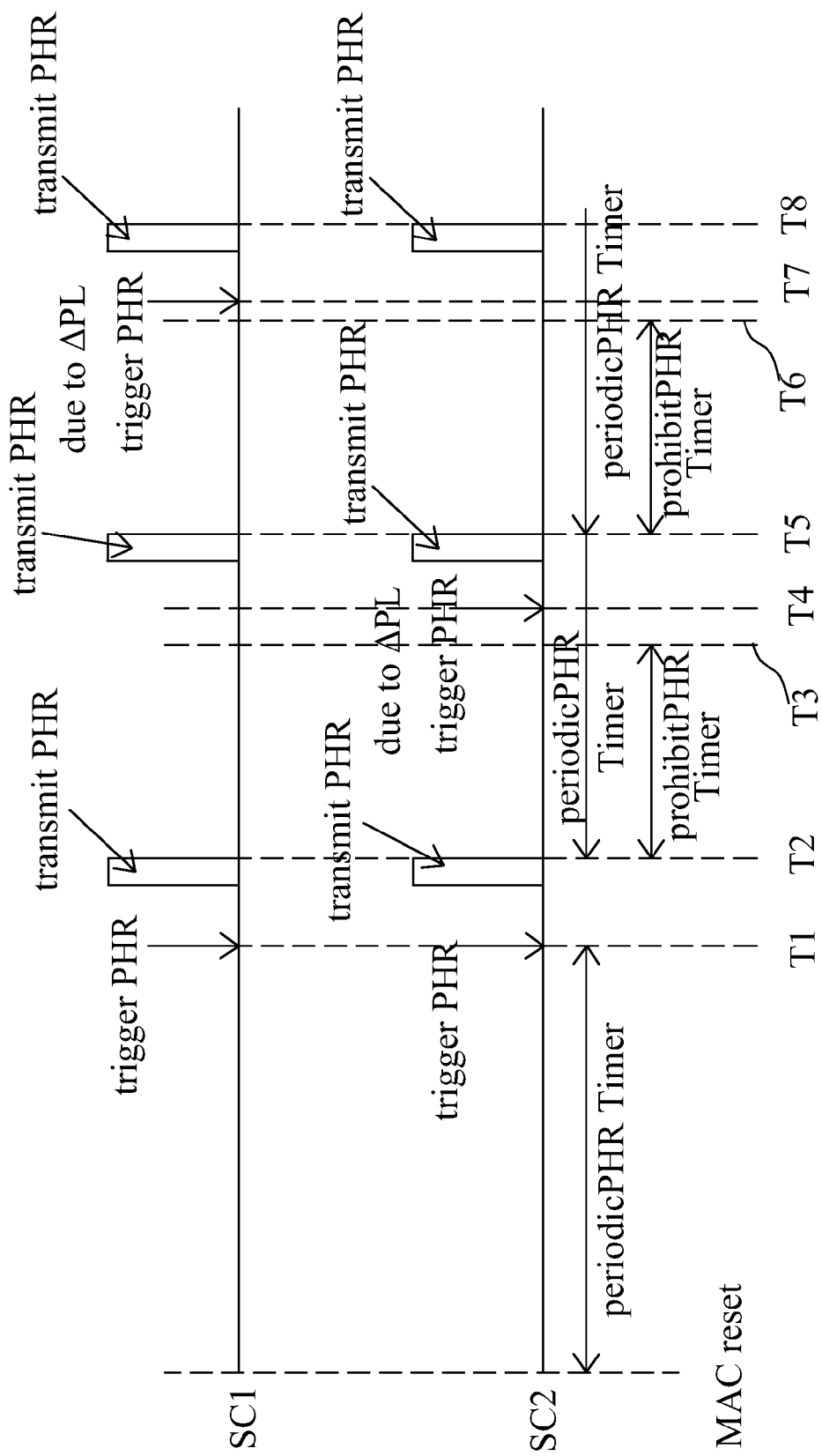
FIG. 7 illustrates a timing chart describing the operation timing of the steps S410~S460 and S605~S656 according to an embodiment of the present invention.

In order to further describe the operation timing of the steps S410~S460 and S605~S656 of the embodiment, a timing chart as showing in FIG. 7 is provided. In this FIG. 7, two activated serving cells, which is labeled by SC1 and SC2, supporting the UE is assumed.

At beginning, the MAC reset, and the periodicPHR-Timer is started. At the time point T1, the periodicPHR-Timer expires, so that the PHR is triggered. When the UE has uplink resources for new transmission, the PHR is transmitted at the time point T2, and the periodicPHR-Timer and the prohibitPHR-Timer are both started. At the time point T3, the prohibitPHR-Timer expired. At the time point T4 when a uplink grant for new transmission is received, it is assumed that the path loss for the SC2 changes more than the PathlossChange threshold since T2, so that the PHR for SC1 and SC2 is triggered. The PHR for SC1 and SC2 is transmitted at the time point T5 with granted uplink resources which accommodate the PHR MAC control element for new transmission. At the time point T6, the prohibitPHR-Timer expired. At the time point T7 when uplinkgrant for new transmission is received, it is assumed that the path loss for the SC1 changes more than the PathlossChange threshold since T5, so that the PHR for SC1 and SC2 is triggered. The PHR for SC1 and SC2 is transmitted at the time point T8 with granted uplink resources which accommodate the PHR MAC control element for new transmission.

In multi-carrier system, the UE has multiple serving cells configured, but not all of configured serving cells can be operated by the UE, in other words, only part of them are activated for the UE. For conveniently describing the present embodiment, it is assumed that the serving cells in the embodiment are activated. People having ordinary skill in the art should know that the above steps S410~S460 and S605~S656 are performed for the activated serving cells in a transmission time interval.

The Third Embodiment

The abovementioned embodiments for triggering and reporting PHR is provided. In the present embodiment, a possible reporting form of PHR MAC control element is provided.

Figure 8:
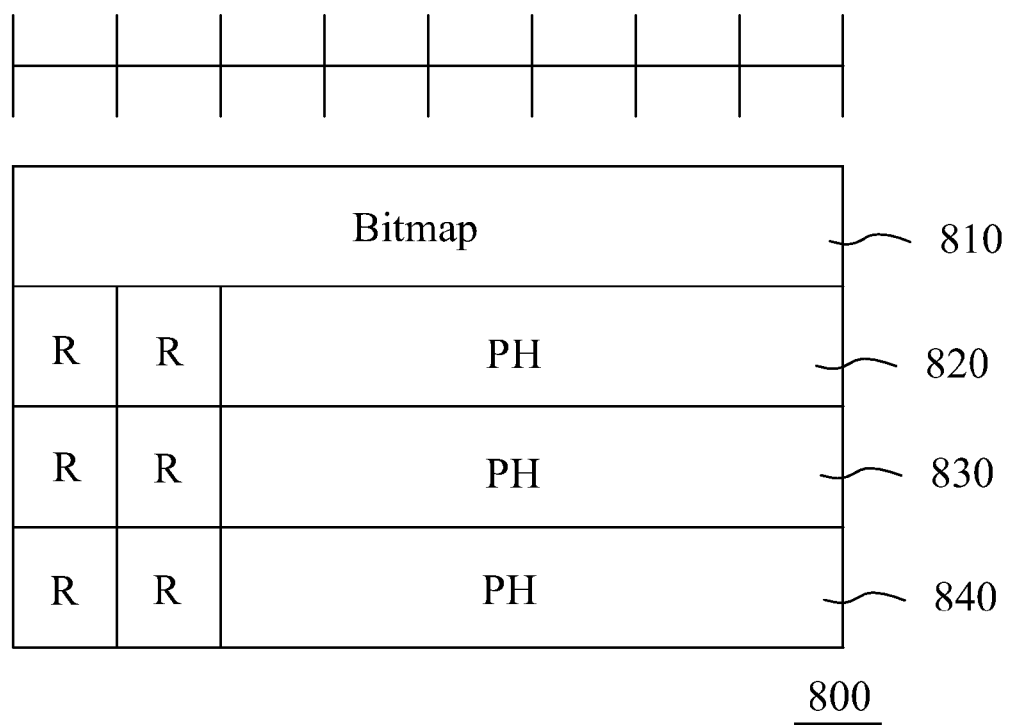
FIG. 8 illustrates an implementation of a power headroom report media access control (PHR MAC)—control element according to an embodiment of the present invention.

An implementation for the PHR MAC control element is provided in the embodiment. Please refer to FIG. 8 which illustrates an implementation of a PHR MAC control element according to an embodiment of the present invention. The implementation of a PHR MAC control element 800 comprises a Ci field 810 and a plurality of power headroom fields 820~840.

The Ci field 810 is a bitmap which comprises a plurality of bits, and indicates whether each power headroom field 820~840 of the corresponding serving cell is reported or not. For example, one bit of the Ci field 810 is set to "1" indicating that the power headroom field of the corresponding serving cell is reported; otherwise, one bit of the Ci field 810 is set to "0" indicating that the power headroom field of the corresponding serving cell is not reported.

Each of the power headroom fields 820~840 indicates a power headroom level of the corresponding activated serving cell. Each power headroom level of the power headroom field is obtained from a quantized value of the power headroom value of the corresponding activated serving cell.

In the embodiment, there are three activated serving cells for example, thus three power headroom fields 820~840 are included in the PHR MAC control element 800. When the number of the activated serving cells is changed, the number of power headroom fields will be accordingly changed. Therefore, the PHR MAC control element 800 is with variable size. In general, the PHR MAC control element is included in a MAC Protocol Data Unit, and a sub-header of MAC Protocol Data Unit comprises a length field to indicate the size of the PHR MAC control element 800.

In the PHR MAC control element 800, each of the power headroom fields 820~840 has two reserved bit for example.

The Fourth Embodiment

In 3GPP E-UTRA system, the UE can report a configured maximum output power corresponding to each serving cell (also called $P_{CMAX,c}$) together with the PHR, so that the eNB can more accurately know and record the current $P_{CMAX,c}$ and use it for more precise power headroom deviation, especially when the transmission on multiple activated serving cells is configured.

An implementation for the PHR MAC control element is provided in the fourth embodiment. Please refer to FIG. 9 which illustrates an implementation of a PHR MAC control element according to an embodiment of the present invention. The implementation of a PHR MAC control element 900 comprises a Ci field 910, a plurality of power headroom fields 920~940 and a plurality of $P_{CMAX,c}$ fields 950~970. The Ci field 910 is similar to the Ci field 810 and the power headroom fields 920~940 are similar to the power headroom fields 820~840. The $P_{CMAX,c}$ fields 950~970 respectively indicates $P_{CMAX,c}$ values corresponding to the activated serving cells, wherein the $P_{CMAX,c}$ field 950 follows the power headroom field 920, and both of the fields 950 and 920 correspond to the same activated serving cell. Then, the $P_{CMAX,c}$ field 960 follows the power headroom field 930, and both of the fields 960 and 930 correspond to the same activated serving cell. The rest fields can be done in the same manner.

The Fifth Embodiment

An implementation for the PHR MAC control element is provided in the fifth embodiment. Please refer to FIG. 10 which illustrates an implementation of a PHR MAC control element according to an embodiment of the present invention. The PHR MAC control element 1000 is similar to the PHR MAC control element 900 in FIG. 9, thus the detail description is omitted.

Figure 9:
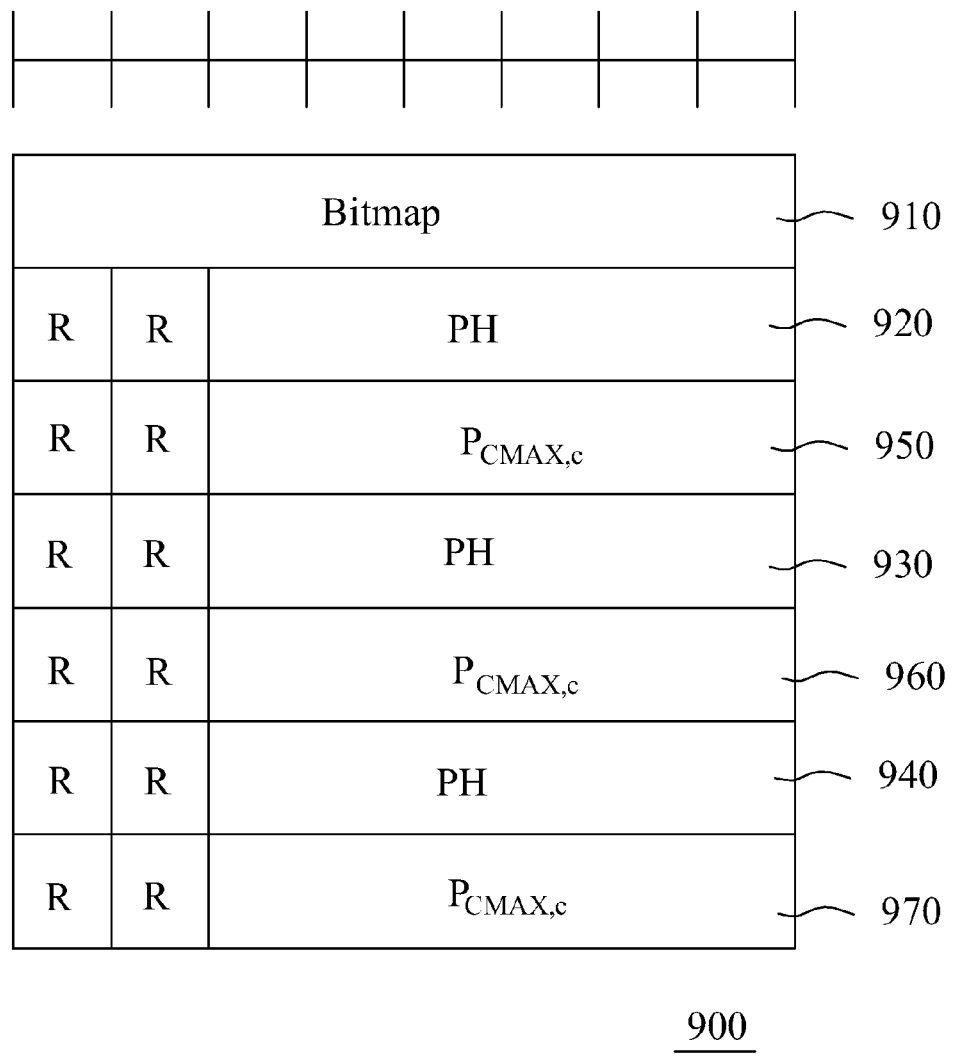
FIG. 9 illustrates an implementation of a PHR MAC control element according to an embodiment of the present invention.
Figure 10:
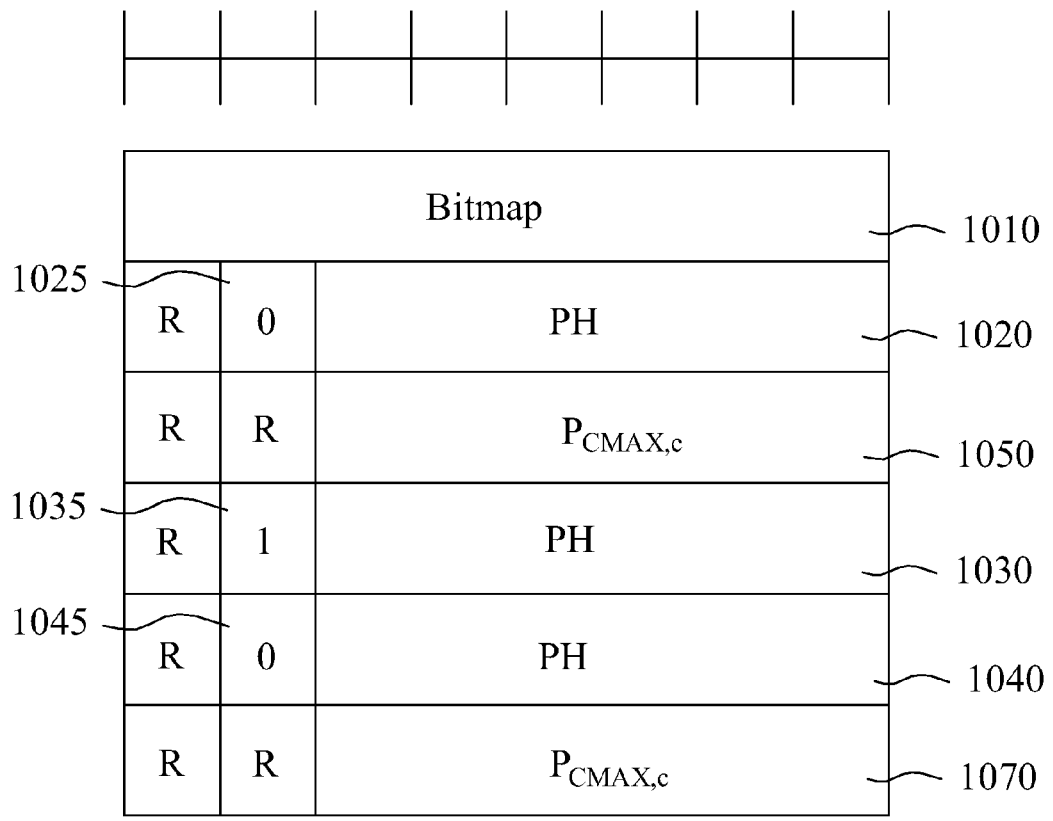
FIG. 10 illustrates an implementation of a PHR MAC control element according to an embodiment of the present invention.

Comparing the FIG. 9 with FIG. 10, people having ordinary skill may notice that each power headroom field 1020, 1030 and 1040 respectively includes a flag 1025, 1035 and 1045 instead of a reserve bit. The flag 1025, 1035 and 1045 are used for indicating whether a following $P_{CMAX,c}$ field exists or not. In this fifth embodiment, if the flag in the power headroom field is set to "0", it represents the following $P_{CMAX,c}$ field corresponding to the power headroom field would be included in the PHR MAC control element. If the flag in the power headroom field is set to "1", it represents the $P_{CMAX,c}$ field corresponding to the power headroom field would not be included in the PHR MAC control element.

In FIG. 10, since the flag 1035 is set to "1", the $P_{CMAX,c}$ field which originally follows the power headroom field 1030 is not included in the PHR MAC control element 1000, and the power headroom field 1040 directly follows the power headroom field 1030. However, people having ordinary skill in the art could also design the following $P_{CMAX,c}$ field exist if the flag is "1" according to the suggestion of the present invention. Thus, the present invention is not restricted thereto.

For reducing overhead of $P_{CMAX,c}$ report, in the fifth embodiment, several situations that the flag is set to "1" is provided as follow:

1. if the $j^{th}$ $P_{CMAX,c}$ values is the same as the $(j-1)^{th}$ $P_{CMAX,c}$ value, that is to say the $j^{th}$ $P_{CMAX,c}$ field may be unnecessary, the flag of the $j^{th}$ power headroom field would be set to "1" so that the bandwidth usage of PHR MAC control element can be reduced, wherein "j" is a nature number and smaller than or equal to the number of the activated serving cells. In a preferred embodiment of the present invention, it is suggested that at least the first $P_{CMAX,c}$ value should be included in the PHR MAC control element. However, people having ordinary skill in the art should know that whether the $P_{CMAX,c}$ value is included in the PHR MAC control element can be optionally designed according to the requirement of the system. The present invention is not restricted thereto.

2. if the $j^{th}$ $P_{CMAX,c}$ values is the same as a predefined value which can be calculated by a predefined equation, the flag of the $j^{th}$ power headroom field would be set to "1", wherein "j" is a nature number and smaller than or equal to the number of the activated serving cells.

However, people having ordinary skill in the art should know that the flag setting rule may not only comprise the abovementioned two rules so that the present invention is not restricted thereto.

The Sixth Embodiment

In the sixth embodiment, the UE is configured with simultaneous transmission of a physical uplink control channel (PUCCH) and a physical uplink shared channel (PUSCH) on the same component carrier, so that uplink control information and data can be transmitted on the same component carrier. However, the simultaneous transmission will affect the quality of the two physical channels. Therefore, when the network side performs uplink scheduling on the physical uplink shared channel, the knowledge related to power contribution of the physical uplink control channel to the current UE transmission power is necessary. Base on the above, a type 1 PHR, which only consider the transmission of the physical uplink shared channel, and a type 2 PHR, which considers the simultaneous transmission of the physical uplink control channel and the physical uplink shared channel, should be reported.

In the sixth embodiment, the PHR comprises a type 1 power headroom and a type 2 power headroom. The type 1 power headroom value is computed as a $P_{CMAX,c}$ minus power of the physical uplink shared channel, and the type 2 power headroom value is computed as a $P_{CMAX,c}$ minus the power of the physical uplink control channel minus the power of the physical uplink shared channel. For conveniently describing the present embodiment, it is assumed that the UE performs transmission/reception only in a primary cell, and the simultaneous transmission of the physical uplink control channel and the physical uplink shared channel is on the primary cell. Besides, it is assumed that the UE is operated in 3GPP LTE-Advanced system. For conveniently describing the present embodiment, the method of performing Power Headroom reporting procedure provided in the embodiment can be divided into a triggering PHR process and a reporting PHR process respectively illustrated in FIG. 11 and FIG. 13. Please refer to FIG. 11 which illustrates a flowchart of the triggering PHR process according to an embodiment of the present invention. The triggering PHR process comprises following steps.

In step S1110, the process for triggering a PHR starts.

Figure 12:
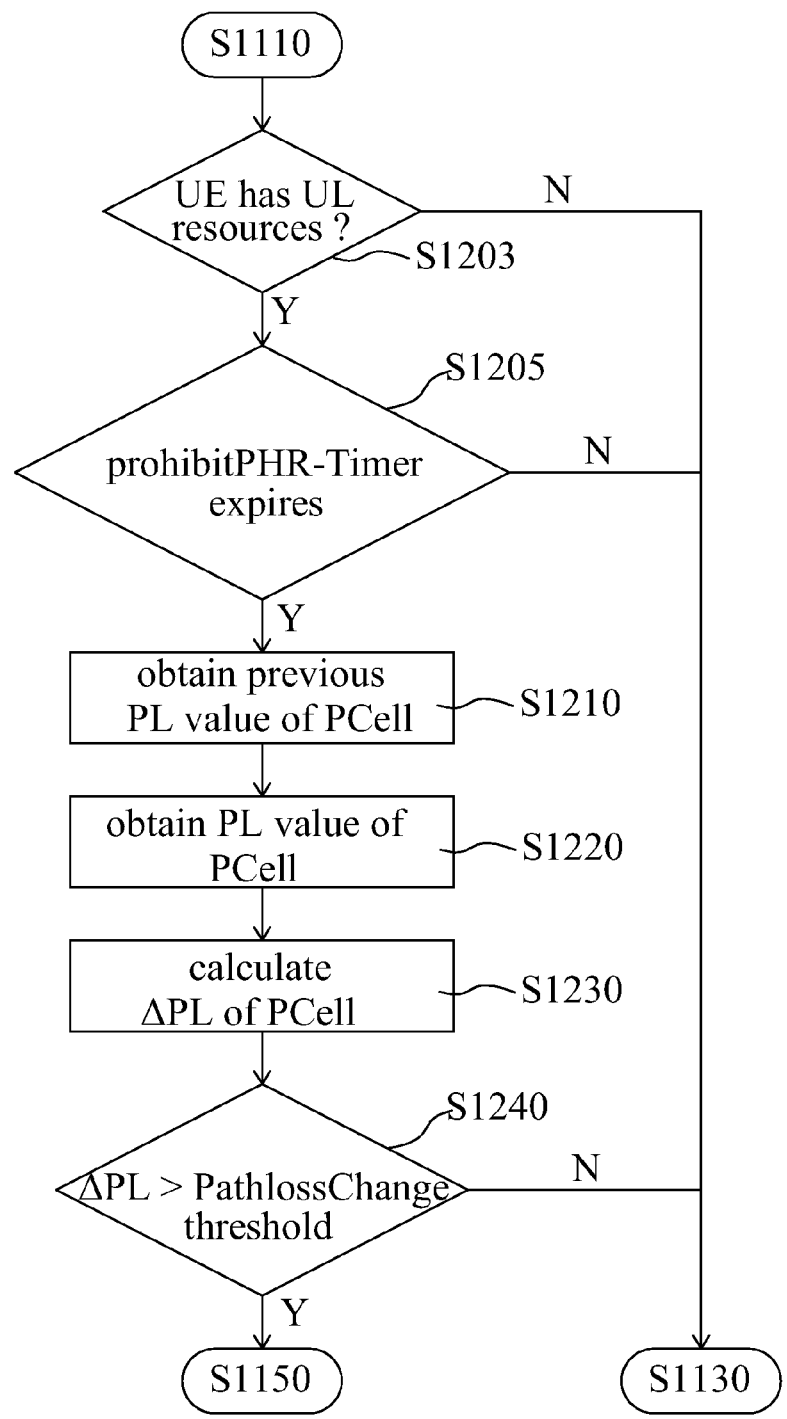
FIG. 12 illustrates a flowchart describing the sub-steps of the step S1120 according to an embodiment of the present invention.

In step S1120, it is determined whether a prohibitPHR-Timer expires or has expired and a downlink path loss value is changed (ΔPL) more than a PathlossChange threshold since the last transmission of the previous PHR when the UE has uplink resources for new transmission. The step S1120 in this embodiment further includes several sub-steps showing in FIG. 12. Please referring to FIG. 12, the step S1120 includes the steps as follow.

In step S1203, it is determined whether the UE has uplink (UL) resources for new transmission.

In step S1205, it is determined whether the prohibitPHR-Timer expires or has expired. Although the step S1205 follows the steps S1203, people having ordinary skill in the art should know that the step S1203 can also follows the steps S1205. therefore, the present invention is not restricted thereto.

In step S1210, a previous downlink path loss (PL) value corresponding to the primary cell (PCell) is obtained at the last transmission of the previous PHR.

In step S1220, a downlink path loss (PL) value corresponding to the primary cell (PCell) is obtained when the UE has uplink resources for new transmission.

In step S1230, a deviation (ΔPL) between the downlink path loss value and the previous downlink path loss value corresponding to the primary cell (PCell) is calculated.

In step S1240, it is determined whether the deviation (ΔPL) of the primary cell (PCell) is larger than the PathlossChange threshold. If the deviation of the primary cell (PCell) is larger than the PathlossChange threshold, the step S1150 is performed. On the contrary, if the deviation is smaller than the PathlossChange threshold, the step S1130 is performed.

When the UE suffers severe interferences, the path loss values will change frequently. The prohibitPHR-Timer is used for preventing the PHR from being continuously triggered when the path loss values changes frequently.

Figure 11:
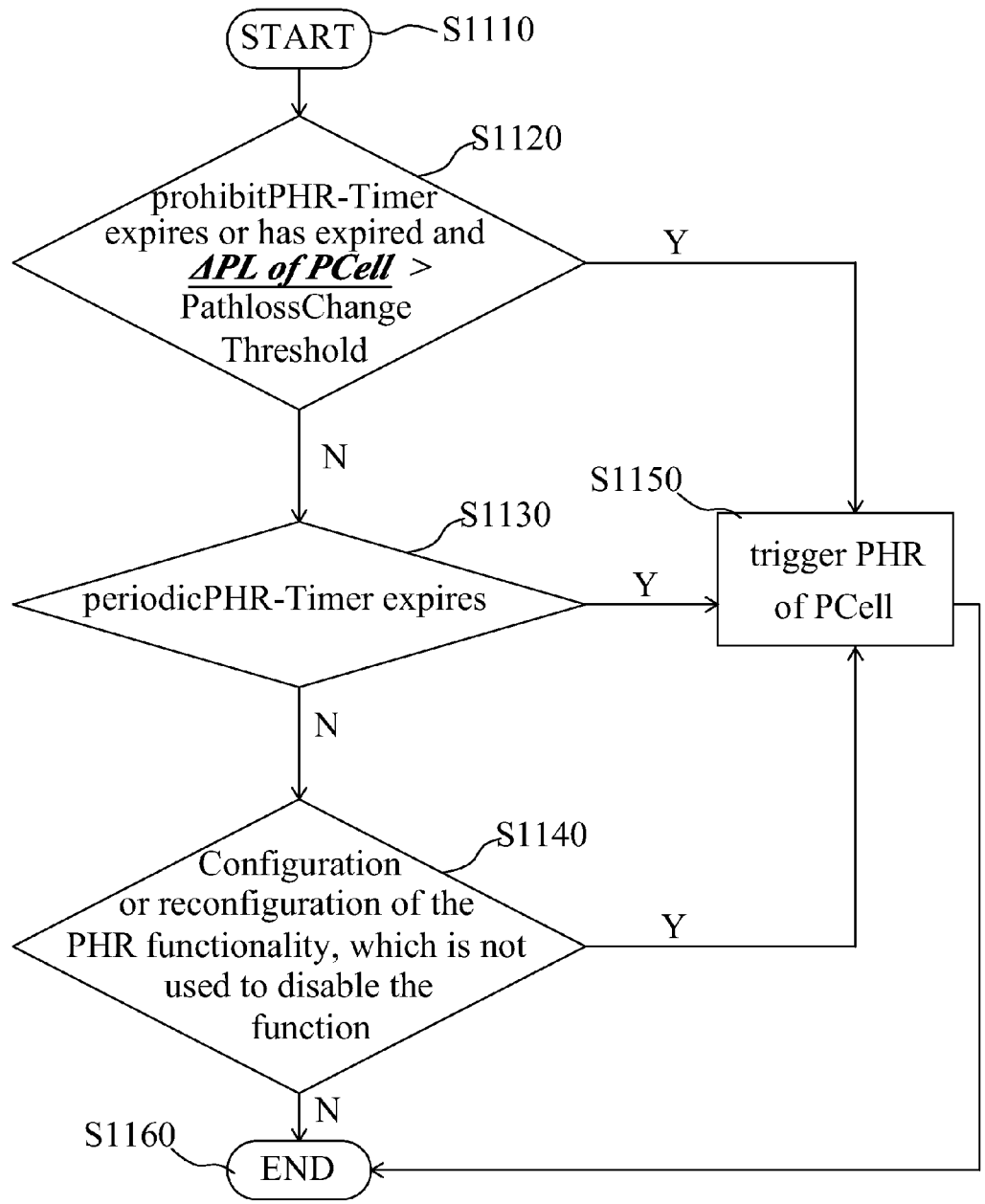
FIG. 11 illustrates a flowchart of the triggering PHR process according to an embodiment of the present invention.

Please refer to FIG. 11.

In step S1130, it is determined whether a periodicPHR-Timer expires.

In step S1140, it is determined whether the PHR functionality is configured or reconfigured by upper layers. The configured/reconfigured PHR functionality in step S1140 doesn't include the function which is used to disable the PHR mechanism.

In step S1150, the PHR is triggered.

In step S1160, the process for triggering the PHR ends.

According to the description above, the PHR shall be triggered if any of the above three conditions occurs, wherein the three conditions comprises:

1. the prohibitPHR-Timer expires or has expired and the downlink path loss has changed more than the Pathloss-Change threshold since the last transmission of the previous PHR when UE has uplink resources for new transmission;

2. the periodicPHR-Timer expires;

3. the PHR functionality is configured or reconfigured by upper layers.

However, people having ordinary skill in the art should know that there are more conditions that the PHR would be triggered. For example, the conditions for triggering the PHR may further comprise the event when the number of the activated serving cells is changed or when the activation status of the serving cells is changed, thus the present invention is not restricted thereto.

Figure 13:
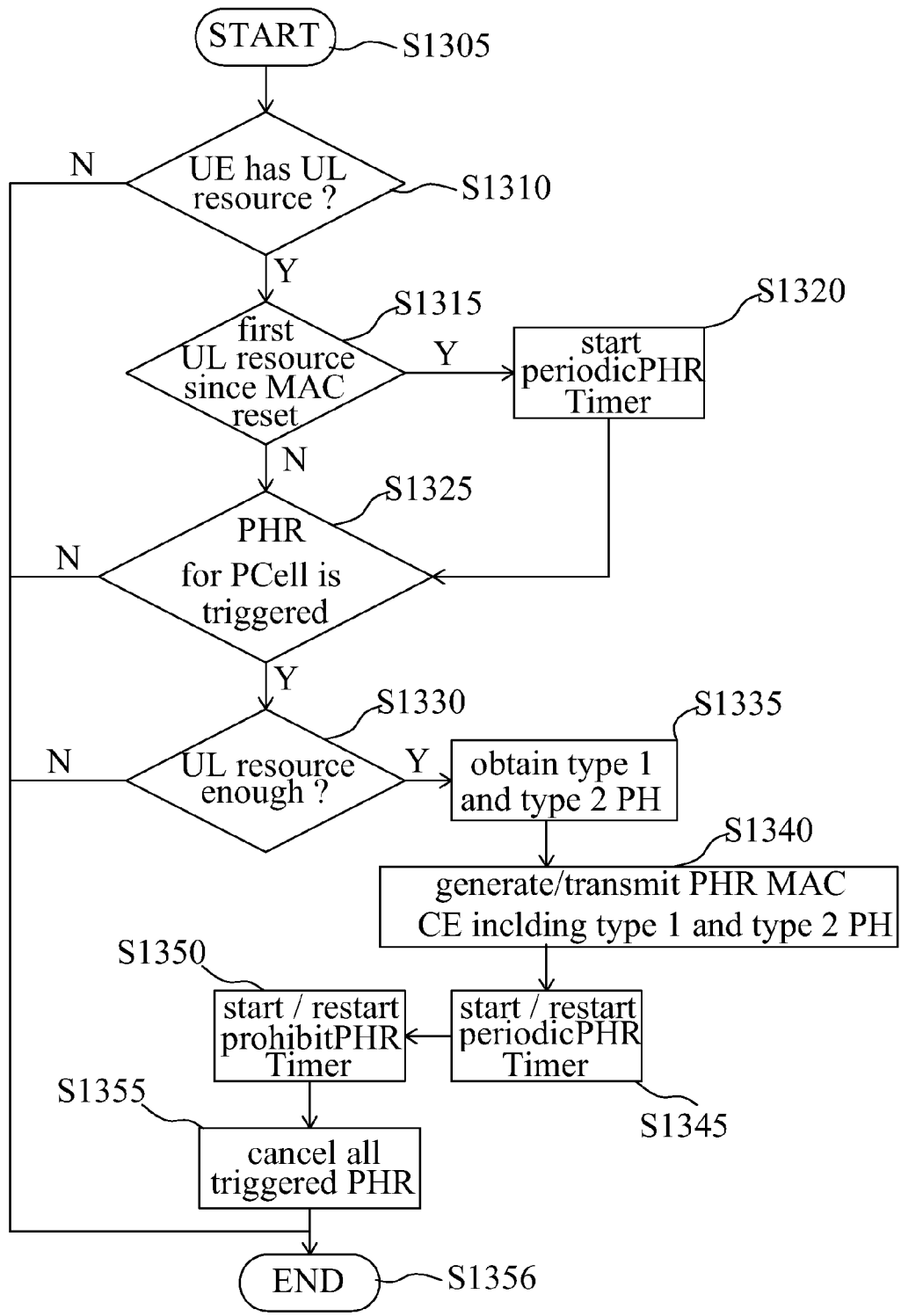
FIG. 13 illustrates a flowchart of the reporting PHR process according to an embodiment of the present invention.

Please refer to FIG. 13 which illustrates a flowchart of the reporting PHR process according to an embodiment of the present invention. The reporting PHR process comprises following steps.

In step S1305, the process for reporting a PHR starts.

In step S1310, it is determined whether the UE has uplink (UL) resources for new transmission.

In step S1315, it is determined whether this is the first uplink (UL) resource for new transmission since the last Medium Access Control (MAC) reset.

In step S1320, the periodicPHR-Timer is started.

In step S1325, it is determined whether the PHR has been triggered since the last transmission of the previous PHR or whether it is the first time that the PHR is triggered, wherein the PHR is for the primary cell (PCell).

In step S1330, it is determined whether the uplink (UL) resources are capable of accommodating a PHR Medium Access Control (MAC) control element plus a sub-header thereof. In the embodiment, the PHR comprises type 1 power headroom and type 2 power headroom corresponding to the primary cell, and the PHR is carried by the PHR MAC control element. Especially, the step S1330 is determined after the logical channel prioritization, wherein the logical channel prioritization has already described in 3GPP TS 36.321 specification. The detail description thereof is omitted.

In step S1335, a type 1 power headroom value (PH) and a type 2 power headroom value (PH) corresponding to the primary cell are obtained from a physical layer.

In step S1340, the multiplexing and assembly procedure are instructed to generate and transmit the PHR MAC control element based on the type 1 power headroom value (PH) and the type 2 power headroom value (PH).

In step S1345, the periodicPHR-Timer is started or restarted.

In step S1350, the prohibitPHR-Timer is started or restarted.

In step S1355, the triggered PHR(s) is/are cancelled. The PHR may be triggered plural of times before the PHR transmission. For example, the periodicPHR-Timer expires, the prohibitPHR-Timer expires and ΔPL is larger than the PathlossChange threshold since the last transmission of the previous PHR. If the above situations occur and UE dose not have uplink resources for new transmission or UE does not have enough uplink resources for new transmission to accommodate the PHR Medium Access Control (MAC) control element plus the sub-header, the PHR would be triggered plural of times. In this step S1355, the all triggered PHRs would be canceled.

In step S1356, the process for reporting a PHR ends.

People having ordinary skill in the art should know that the simultaneous transmission of the physical uplink shared channel and the physical uplink control channel may not always occur. When the simultaneous transmission of the physical uplink shared channel and the physical uplink control channel is disabled by the network side, the type 2 power headroom will not be reported in the PHR MAC control element.

The Seventh Embodiment

The abovementioned embodiment for triggering and reporting PHR is provided when the simultaneous transmission is enabled for the primary cell. In the present embodiment, a possible reporting form of PHR MAC control element is provided.

An implementation for the PHR MAC control element is provided in the seventh embodiment. Please refer to FIG. 14 which illustrates an implementation of a PHR MAC control element according to an embodiment of the present invention. The implementation of a PHR MAC control element 1400 comprises a Ci field 1410, a type 2 power headroom field 1420 and a type 1 power headroom field 1430.

The type 2 power headroom field 1420 indicates a type 2 power headroom level of the primary cell. The type 1 power headroom field 1430 indicates a type 1 power headroom level of the primary cell. The type 2 power headroom level is obtained from a quantized value of the type 2 power headroom value which is obtained in the physical layer. The type 1 power headroom level is obtained from a quantized value of the type 1 power headroom value which is obtained in the physical layer. However, people having ordinary skill in the art should know that the simultaneous transmission of the physical uplink shared channel and the physical uplink control channel may not always occur. When the simultaneous transmission of the physical uplink shared channel and the physical uplink control channel is disabled by the network side, the type 2 PHR will not be reported and the type 2 power headroom field 1420 may be removed from the PHR MAC control element 1400.

The Ci field 1410 is a bitmap which comprises a plurality of bits, and indicates whether each power headroom field is reported or not. The bitmap of the Ci field 1410 is similar to one of the Ci field 810 in FIG. 8, thus, the detail description is omitted here. Since it is assumed that the activated serving cell is only the primary cell and not included any secondary cell in the present embodiment, the Ci field 1410 is useless in the present embodiment. In addition, the PHR MAC control element 1400 is included in a MAC Protocol Data Unit, and a sub-header of MAC Protocol Data Unit comprises a length field to indicate the size of the PHR MAC control element 1400.

The Eighth Embodiment

An implementation for the PHR MAC control element is provided in the eighth embodiment. Please refer to FIG. 15 which illustrates an implementation of a PHR MAC control element according to an embodiment of the present invention. The PHR MAC control element comprises a type 2 power headroom field 1520 and a type 1 power headroom field 1530. Since the PHR MAC control element 1500 is similar to the PHR MAC control element 1400 in FIG. 14, thus the detail description is omitted.

Figure 14:
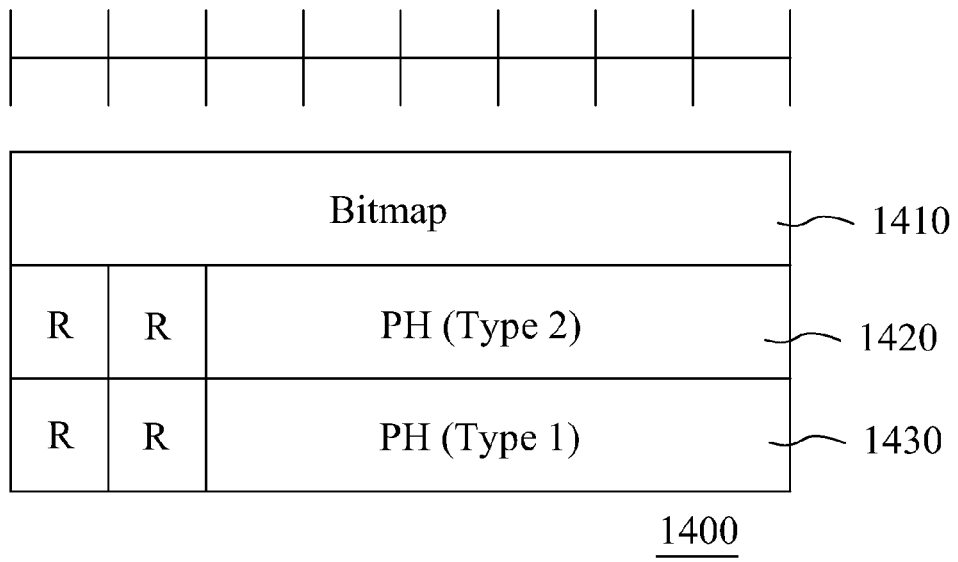
FIG. 14 illustrates an implementation of a PHR MAC control element according to an embodiment of the present invention.
Figure 15:
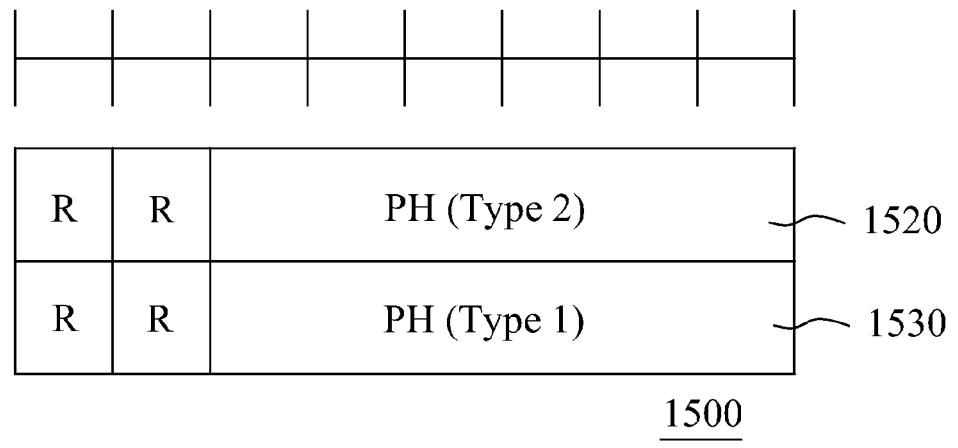
FIG. 15 illustrates an implementation of a PHR MAC control element according to an embodiment of the present invention.

Comparing the FIG. 14 with FIG. 15, people having ordinary skill may notice that the Ci field 1410 is removed from the PHR MAC control element 1500 since the Ci field 1410 is useless in the present embodiment.

The Ninth Embodiment

An implementation for the PHR MAC control element is provided in the ninth embodiment. Please refer to FIG. 16 which illustrates an implementation of a PHR MAC control element according to an embodiment of the present invention. The implementation of a PHR MAC control element 1600 comprises a Ci field 1610, a type 2 power headroom field 1620, a type 1 power headroom field 1630, a first $P_{CMAX,c}$ field 1640 and a second $P_{CMAX,c}$ field 1650. The Ci field 1610 is similar to the Ci field 1410 and the type 2 and type 1 power headroom fields 1620~1630 are similar to the type 2 and type 1 power headroom fields 1420~1430. The first $P_{CMAX,c}$ field 1640 follows the type 2 power headroom field 1620 and indicates a $P_{CMAX,c}$ value corresponding to the type 2 power headroom level. The second $P_{CMAX,c}$ field 1650 follows the type 1 power headroom field 1630 and indicates a $P_{CMAX,c}$ value corresponding to the type 1 power headroom level. Since the Ci field 1610 is useless in this embodiment, the Ci field can be removed in a preferred embodiment.

In this embodiment, the type 2 power headroom can be calculated as follow:

The type 2 PH=the first $P_{CMAX,c}$–the power of PUCCH–the power of PUSCH.

Furthermore, in this embodiment, the type 1 power headroom can be calculated as follow:

The type 1 PH=the second $P_{CMAX,c}$–the power of PUSCH.

The Tenth Embodiment

An implementation for the PHR MAC control element is provided in the tenth embodiment. Please refer to FIG. 17 which illustrates an implementation of a PHR MAC control element according to an embodiment of the present invention. The PHR MAC control element 1700 is similar to the PHR MAC control element 1600 in FIG. 16, thus the detail description is omitted.

Figure 16:
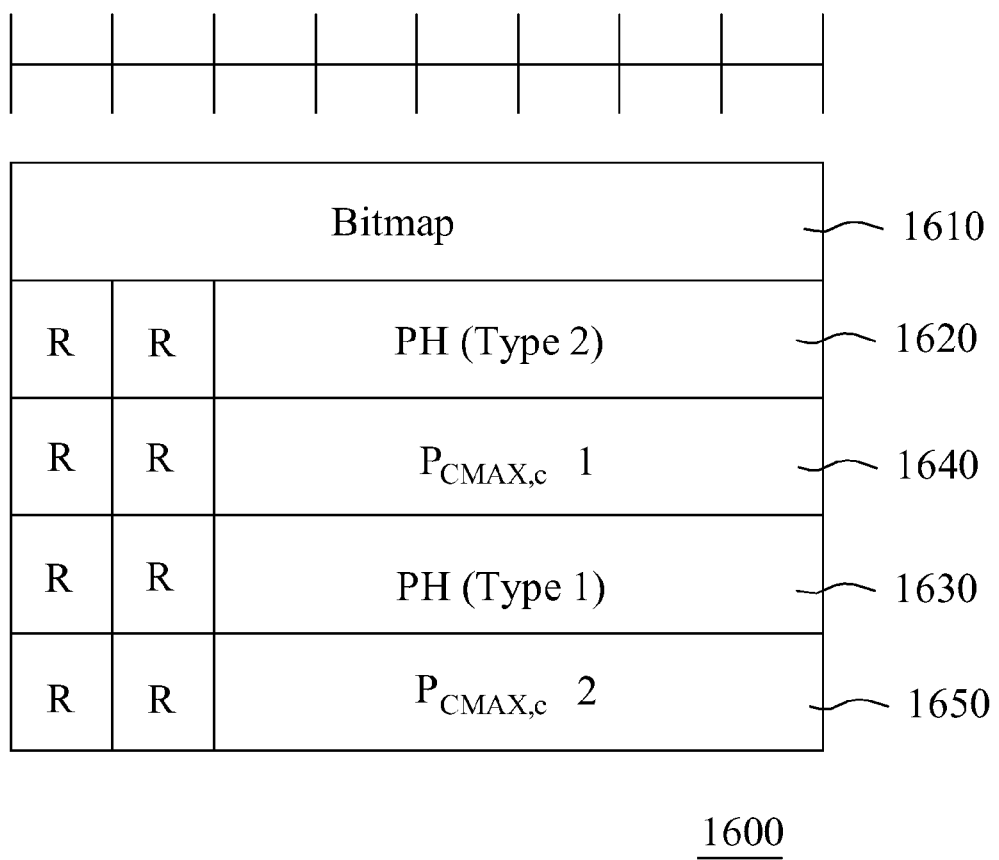
FIG. 16 illustrates an implementation of a PHR MAC control element according to an embodiment of the present invention.
Figure 17:
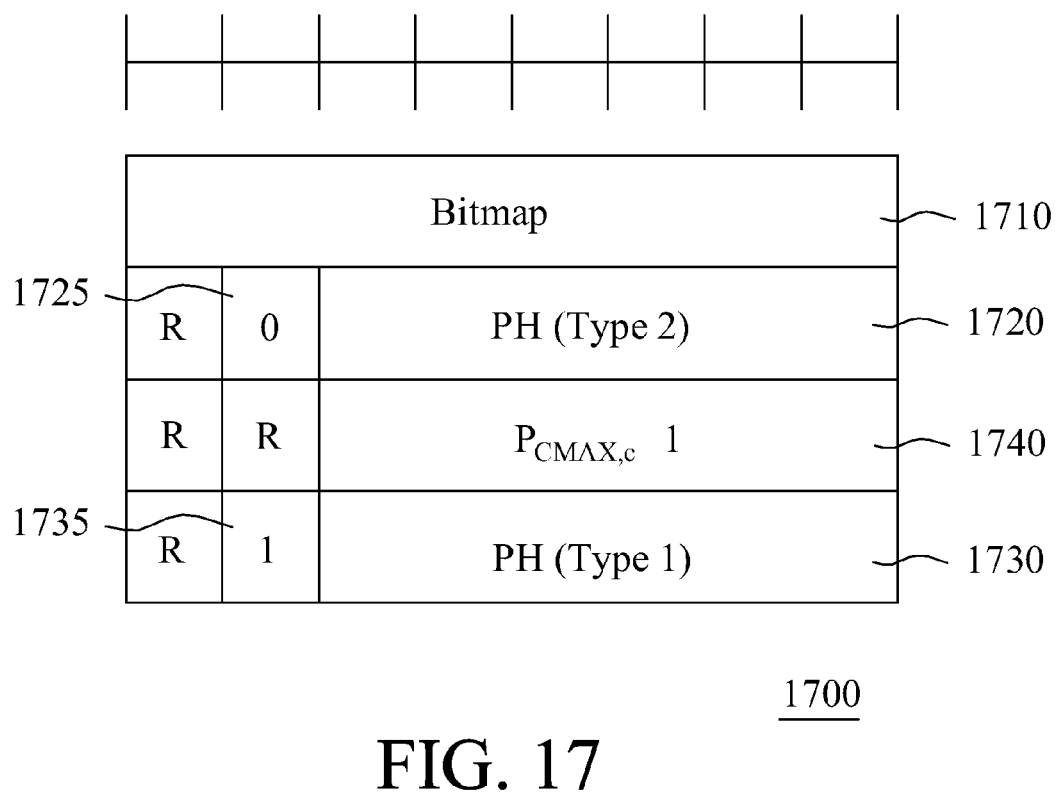
FIG. 17 illustrates an implementation of a PHR MAC control element according to an embodiment of the present invention.

Comparing the FIG. 16 with FIG. 17, people having ordinary skill may notice that the type 2 and type 1 power headroom field 1720 and 1730 respectively include a flag 1725 and a flag 1735 instead of the reserve bits therein. The flag 1725 and 1735 are used for indicating whether a following $P_{CMAX,c}$ field exists or not. In this tenth embodiment, if the flag in the power headroom field is set to "0", it represents the following $P_{CMAX,c}$ field corresponding to the power headroom field would be included in the PHR MAC control element. If the flag in the power headroom field is set to "1", it represents the $P_{CMAX,c}$ field corresponding to the power headroom field would not be included in the PHR MAC control element.

In FIG. 17, since the flag 1735 is set to "1", the second $P_{CMAX,c}$ field 1650 which originally follows the power headroom field 1630 in FIG. 16 is not included in the PHR MAC control element 1700. In the tenth embodiment, several situations that the flag is set to "1" is provided as follow:

1. if the two $P_{CMAX,c}$ values are the same, and the flag of the later power headroom field would be set to "1". However, even the $P_{CMAX,c}$ values corresponding to the type 1 and type 2 power headroom levels corresponds to the primary cell, the $P_{CMAX,c}$ values are usually different, so that the flag 1725 and flag 1735 may be set to "0".

2. if one of the $P_{CMAX,c}$ values are the same as a predefined value which can be calculated by a predefined equation, the flag of the corresponding power headroom field would be set to "1".

However, people having ordinary skill in the art should know that the flag setting rule may not only comprise the abovementioned two rules so that the present invention is not restricted thereto. Further, people having ordinary skill in the art could also design the following $P_{CMAX,c}$ field exist if the flag is "1" according to the suggestion of the present invention. Thus, the present invention is not restricted thereto.

The Eleventh Embodiment

In the eleventh embodiment, the UE is similarly operated in multi-carrier system and performs transmission/reception in a plurality of activated serving cells. Wherein one specific cell of the activated serving cells is configured with simultaneous transmission of the physical uplink control channel and the physical uplink shared channel. The specific cell is called primary cell, and the rest of the serving cells are called secondary cells which are only used for transmission of the physical uplink shared channel. In the eleventh embodiment, not all of the serving cells are activated for the UE. The activation/deactivation status of the serving cells is controlled by MAC. Besides, it is assumed that the UE is operated in 3GPP LTE-Advanced system.

Moreover, in the present embodiment, the PHR comprises a type 1 power headroom for the primary cell, a type 2 power headroom for the primary cell and a plurality of power headrooms corresponding to secondary cells. The type 1 power headroom value is computed as a $P_{CMAX,c}$ minus power of the physical uplink shared channel, and the type 2 power headroom value is computed as a $P_{CMAX,c}$ minus power of the physical uplink control channel minus power of the physical uplink shared channel. Since the secondary cells are not configured with the simultaneous transmission, the power headrooms for the secondary cells can be classified as type 1 power headroom.

Figure 18:
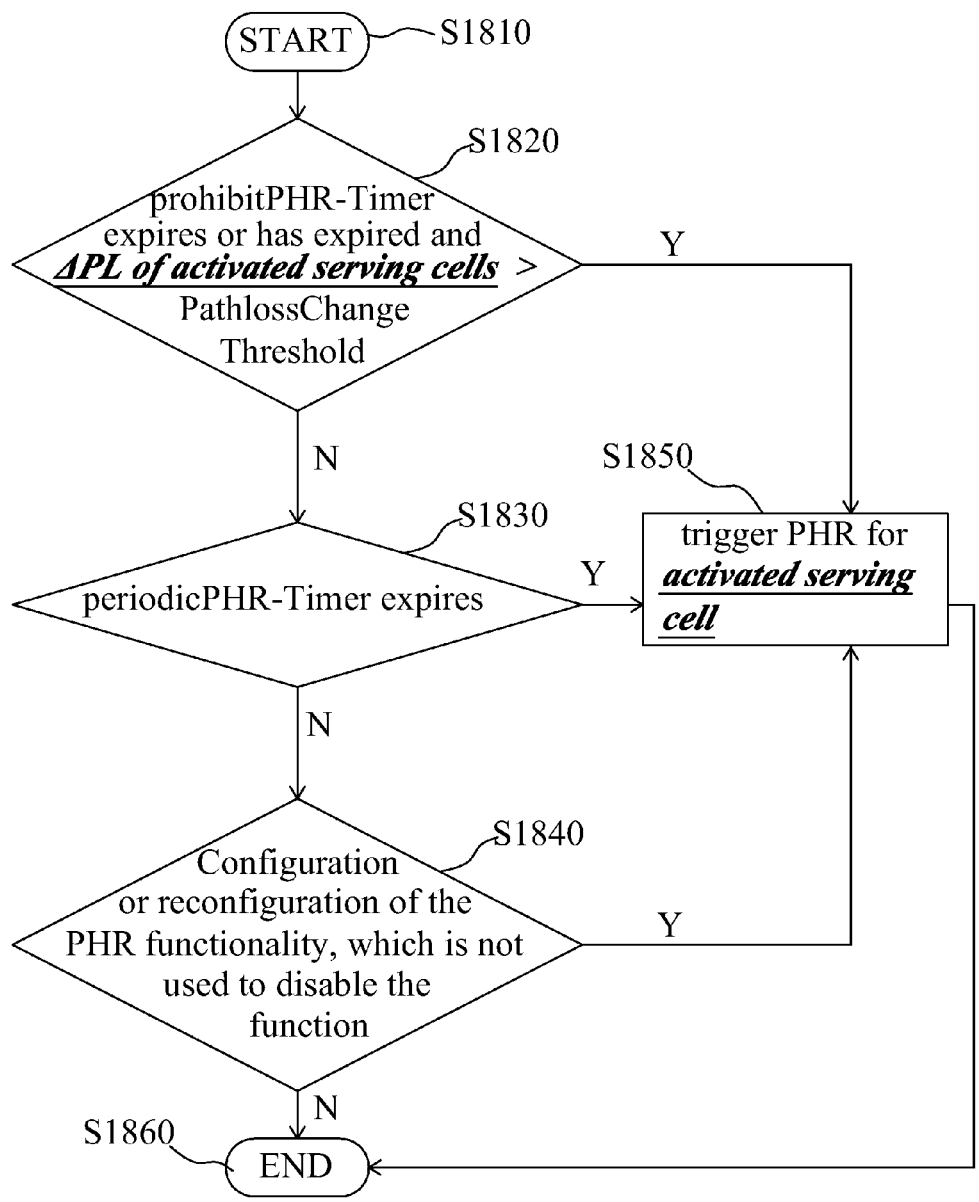
FIG. 18 illustrates a flowchart of the triggering PHR process according to an embodiment of the present invention.
Figure 20:
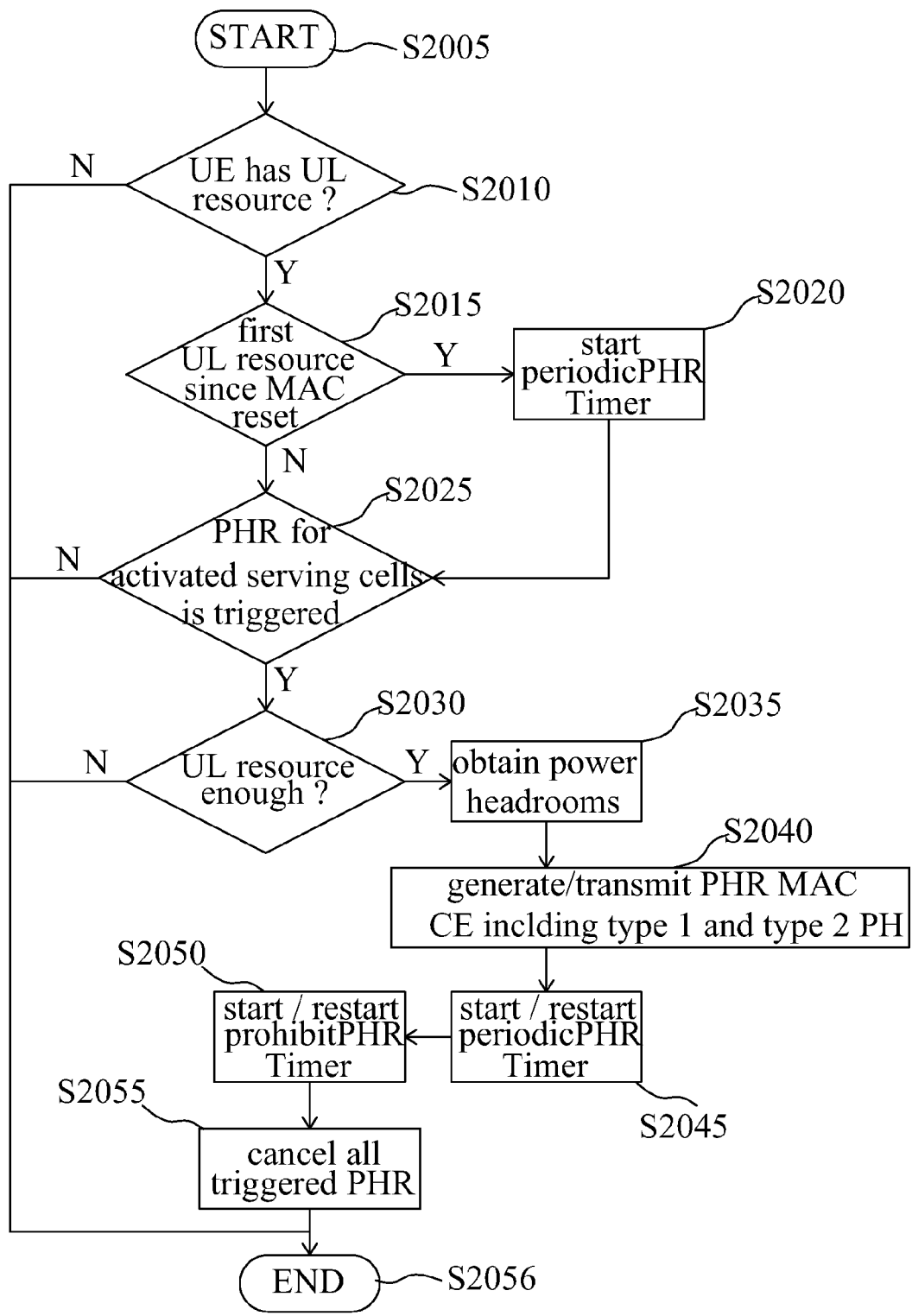
FIG. 20 illustrates a flowchart of the reporting PHR process according to an embodiment of the present invention.

For conveniently describing the eleventh embodiment, the method of performing Power Headroom reporting procedure is divided into a triggering PHR process and a reporting PHR process respectively illustrated in FIG. 18 and FIG. 20. Please refer to FIG. 18 which illustrates a flowchart of the triggering PHR process according to an embodiment of the present invention. The triggering PHR process comprises following steps.

In step S1810, the process for triggering a PHR starts.

Figure 19:
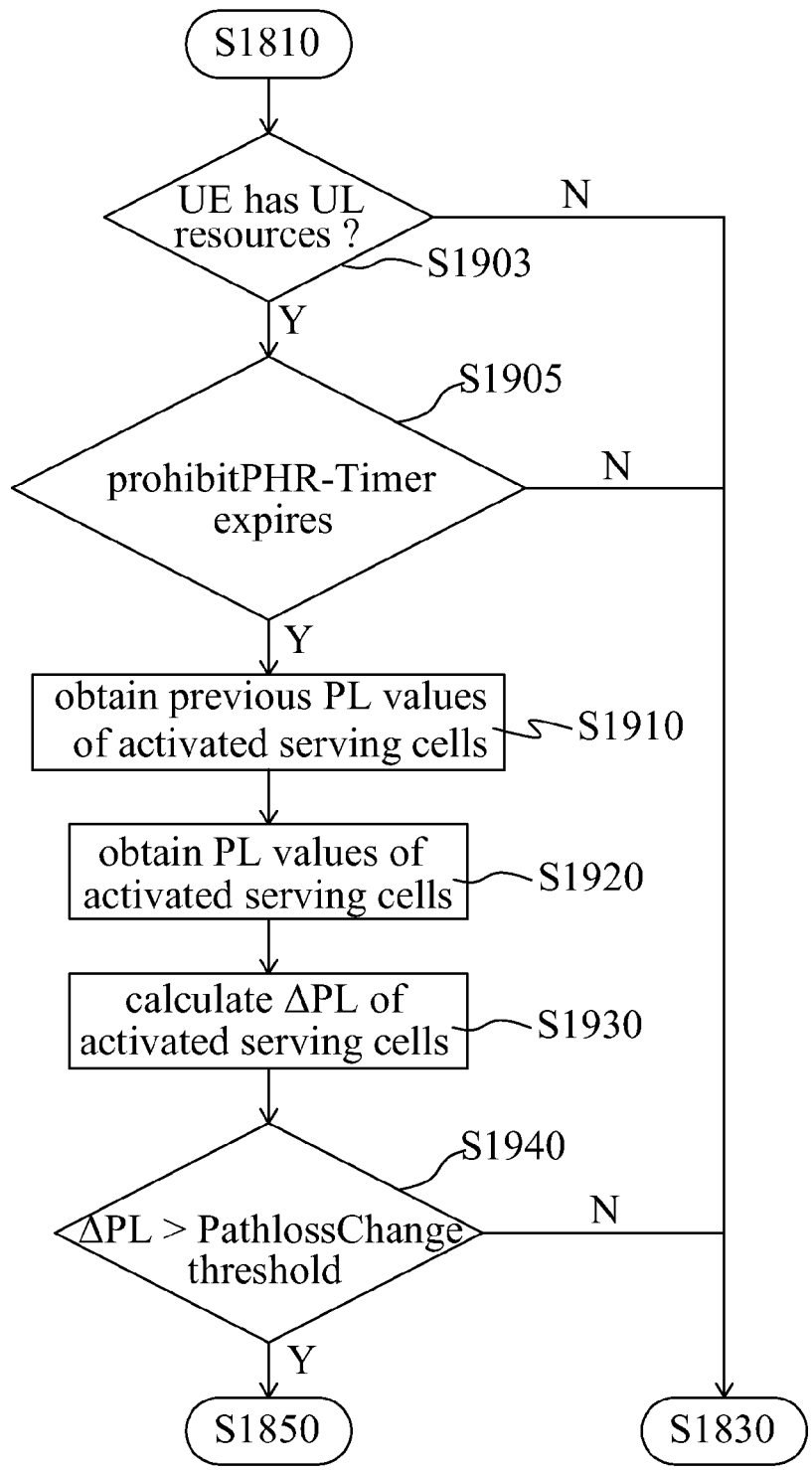
FIG. 19 illustrates a flowchart describing the sub-steps of the step S1820 according to an embodiment of the present invention.

In step S1820, it is determined whether a prohibitPHR-Timer expires or has expired and at least one of the downlink path loss values is changed (ΔPL) more than a PathlossChange threshold since the last transmission of the previous PHR when the UE has uplink resources for new transmission. In the present embodiment, each activated serving cell corresponds to one downlink path loss value, each downlink path loss value is verified that whether the derivation thereof is larger than the PathlossChange threshold or not. The step S1820 in this embodiment further includes several sub-steps showing in FIG. 19. Please referring to FIG. 19, the step S1820 includes the steps as follow.

In step S1903, it is determined whether the UE has uplink (UL) resources for new transmission.

In step S1905, it is determined whether the prohibitPHR-Timer expires or has expired. Although the step S1905 follows the steps S1903, people having ordinary skill in the art should know that the step S1903 can also follows the steps S1905. therefore, the present invention is not restricted thereto.

In step S1910, a plurality of previous downlink path loss (PL) values corresponding to the activated serving cells are obtained at the last transmission of the previous PHR.

In step S1920, a plurality of downlink path loss (PL) values corresponding to the activated serving cell are obtained from a physical layers when the UE has uplink resources for new transmission.

In step S1930, a plurality of deviations (ΔPL) between downlink path loss values and the previous downlink path loss values corresponding to the activated serving cells are respectively calculated.

In step S1940, it is determined whether the deviations (ΔPL) of the activated serving cells are larger than the PathlossChange threshold. If one of the deviations of a corresponding serving cell thereof is larger than the PathlossChange threshold, the step S1850 is performed. On the contrary, if none of the deviations is larger than the PathlossChange threshold, the step S1830 is performed.

When the UE suffers severe interferences, the path loss values will vary frequently and seriously. The prohibitPHR-Timer is used for preventing the PHR from being continuously triggered when the path loss values changes frequently and seriously. Moreover, the length of the prohibitPHR-Timer can be previously configured by radio resource control (RRC) or defined in protocol specification.

Please refer to FIG. 18.

In step S1830, it is determined whether a periodicPHR-Timer expires.

In step S1840, it is determined whether the PHR functionality is configured or reconfigured by upper layers. The configured/reconfigured PHR functionality in step S1840 doesn't include the function which is used to disable the PHR mechanism.

In step S1850, the PHR is triggered for all activated serving cells.

In step S1860, the process for triggering the PHR ends.

According to the description above, the PHR shall be triggered if any of the above three conditions occurs, wherein the three conditions comprises:

1. the prohibitPHR-Timer expires or has expired and at least one of the downlink path loss has changed more than the PathlossChange threshold since the last transmission of the previous PHR when UE has UL resources for new transmission;

2. the periodicPHR-Timer expires;

3. the PHR functionality is configured or reconfigured by upper layers.

However, people having ordinary skill in the art should know that there are more conditions that the PHR would be triggered. The conditions for triggering the PHR may further comprise the event when the activation/deactivation status of the serving cells is changed. Thus, the present invention is not restricted thereto.

Please refer to FIG. 20 which illustrates a flowchart of the reporting PHR process according to an embodiment of the present invention. The reporting PHR process comprises following steps.

In step S2005, the process for reporting a PHR starts.

In step S2010, it is determined whether the UE has uplink (UL) resources for new transmission.

In step S2015, it is determined whether this is the first uplink (UL) resource for new transmission since the last Medium Access Control (MAC) reset.

In step S2020, the periodicPHR-Timer is started.

In step S2025, it is determined whether the PHR has been triggered since the last transmission of the previous PHR or whether it is the first time that the PHR is triggered, wherein the PHR is for all activated serving cells.

In step S2030, it is determined whether the uplink (UL) resources are capable of accommodating a PHR MAC control element plus a sub-header thereof. The PHR is carried by the PHR MAC control element. Especially, the step S2030 is determined after the logical channel prioritization, wherein the logical channel prioritization has already described in 3GPP TS 36.321 protocol specification. The detail description thereof is omitted.

In step S2035, the values of PHR corresponding to the activated serving cells are obtained from a physical layer, wherein the values of PHR includes a type 1 power headroom value for the primary cell, a type 2 power headroom value for the primary cell and power headroom values for secondary cells.

In step S2040, the multiplexing and assembly procedure are instructed to generate and transmit the PHR MAC control element according to the type 1 power headroom value for the primary cell, the type 2 power headroom value for the primary cell and the power headroom values for secondary cells.

In step S2045, the periodicPHR-Timer is started or restarted.

In step S2050, the prohibitPHR-Timer is started or restarted.

In step S2055, the triggered PHR(s) is/are cancelled. The PHR may be triggered plural of times before the PHR transmission. For example, the periodicPHR-Timer expires, the prohibitPHR-Timer expires and ΔPL is larger than the PathlossChange threshold since the last transmission of the previous PHR. If the above situations occur and UE dose not have uplink resources for new transmission or UE does not have enough uplink resources for new transmission to accommodate the PHR Medium Access Control (MAC) control element plus the sub-header, the PHR would be triggered plural of times. In this step S2055, the all triggered PHRs would be cancelled.

In step S2056, the process for reporting a PHR ends.

People having ordinary skill in the art should know that the simultaneous transmission of the physical uplink shared channel and the physical uplink control channel may not always occur. When the simultaneous transmission of the physical uplink shared channel and the physical uplink control channel is disabled by the network side, the type 2 power headroom will not be reported in the PHR MAC control element.

The Twelfth Embodiment

The abovementioned embodiment for triggering and reporting PHR is provided in above embodiment. In the present embodiment, a possible reporting form of PHR MAC control element is provided.

Figure 21:
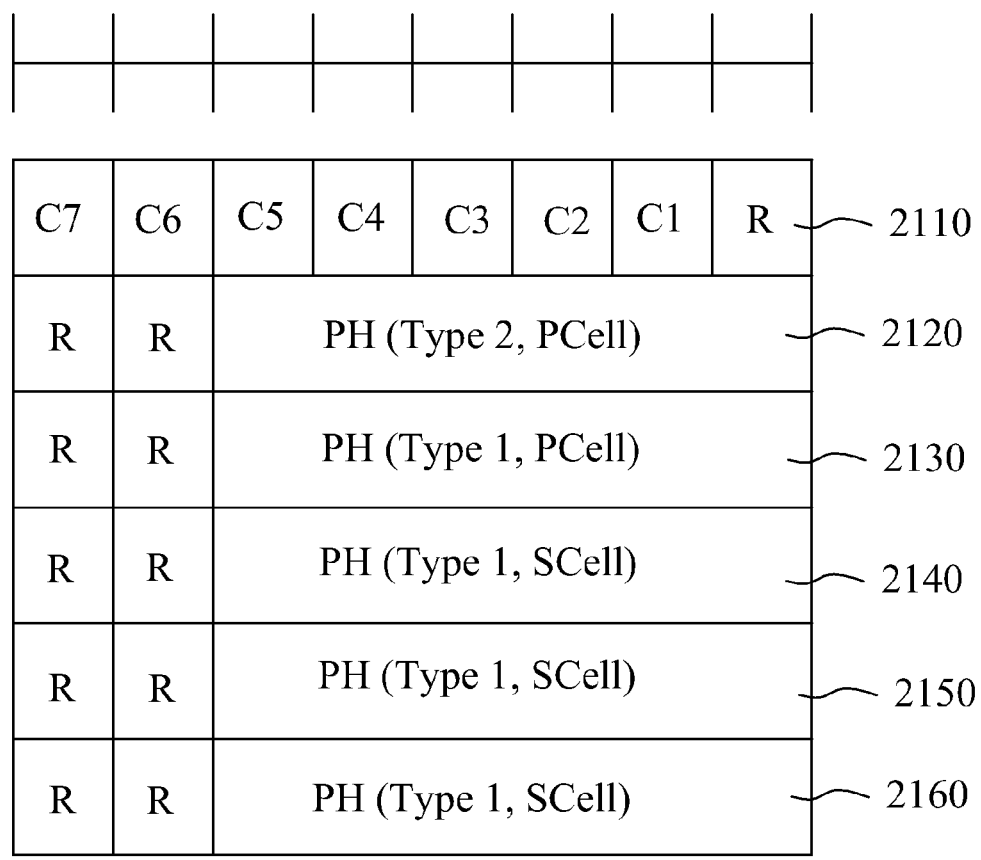
FIG. 21 illustrates an implementation of a PHR MAC control element according to an embodiment of the present invention.

An implementation for the PHR MAC control element is provided in the twelfth embodiment. Please refer to FIG. 21 which illustrates an implementation of a PHR MAC control element according to an embodiment of the present invention. The implementation of a PHR MAC control element 2100 comprises a Ci field 2110, a type 2 power headroom field 2120, a type 1 power headroom field 2130 and a plurality of secondary cell power headroom fields 2140, 2150 and 2160.

The type 2 power headroom field 2120 and the type 1 power headroom field 2130 are respectively similar to the type 2 power headroom field 1420 and the type 1 power headroom field 1430 in FIG. 14. Each of the secondary cell power headroom fields 2140, 2150 and 2160 indicate their corresponding power headroom level of their corresponding activated secondary cell. Each power headroom level of the secondary cell power headroom field 2140, 2150 and 2160 is obtained from a quantized value of the power headroom value of the corresponding activated secondary cell. However, people having ordinary skill in the art should know that the simultaneous transmission of the physical uplink shared channel and the physical uplink control channel may not always occur. When the simultaneous transmission of the physical uplink shared channel and the physical uplink control channel is disabled by the network side, the type 2 PHR will not be reported and the type 2 power headroom field 2120 may be removed from the PHR MAC control element 2100.

The Ci field 2110 is a bitmap which comprises a plurality of bits with cell index "i", and the Ci field 2110 is used for indicating whether each secondary cell power headroom field is reported. For example, the $i^{th}$ bit of the Ci field 2110 is set to "1" indicating that the corresponding power headroom field for the secondary cell with cell index "i" is reported; otherwise, the $i^{th}$ bit of the Ci field 2110 is set to "0" indicating that the corresponding power headroom field for the secondary cell with cell index "i" is not reported. In the FIG. 21, the cell index "i" is nature number, and "i" is smaller than and equal to 7. In the PHR MAC control element 2100, it is assumed that 3 secondary cell power headroom fields are reported. Therefore, three bits in the Ci field 2110 is set to "1", and the number of the secondary cell power headroom fields 2140, 2150 and 2160 is 3 as well. However, people having ordinary skill in the art could also design that the bit of the Ci field 2110 is "0" if the corresponding secondary cell is activated according to the suggestion of the present invention. Thus, the present invention is not restricted thereto. Moreover, the cell index is C1~C7 in the embodiment, however, the number of secondary cells used for the UE is depended on the UE capabilities. Therefore, the present invention is not restricted the number of secondary cells. In addition, the PHR MAC control element 2100 is included in a MAC Protocol Data Unit, and a sub-header of MAC Protocol Data Unit comprises a length field to indicate the size of the PHR MAC control element 2100.

The Thirteenth Embodiment

An implementation for the PHR MAC control element is provided in the thirteenth embodiment. Please refer to FIG. 22 which illustrates an implementation of a PHR MAC control element according to an embodiment of the present invention. The implementation of a PHR MAC control element 2200 comprises a Ci field 2210, a type 2 power headroom field 2220, a type 1 power headroom field 2230, a plurality of secondary cell power headroom fields 2240~2260, a first $P_{CMAX,c}$ field 2221, a second $P_{CMAX,c}$ field 2231, and a plurality of secondary cell $P_{CMAX,c}$ fields 2271~2273. The Ci field 2210 is similar to the Ci field 2110 and the type 2 and type 1 power headroom fields 2220 and 2230 are respectively similar to the type 2 and type 1 power headroom fields 2120 and 2130. The first $P_{CMAX,c}$ fields 2221 indicate the first $P_{CMAX,c}$ value corresponding to the type 2 power headroom field 2220. The second $P_{CMAX,c}$ fields 2231 indicate the second $P_{CMAX,c}$ value corresponding to the type 1 power headroom field 2210. Each of the secondary cell $P_{CMAX,c}$ fields 2271, 2272 and 2273 respectively indicate the $P_{CMAX,c}$ values of their corresponding activated secondary cells.

The Fourteenth Embodiment

An implementation for the PHR MAC control element is provided in the fourteenth embodiment. Please refer to FIG. 23 which illustrates an implementation of a PHR MAC control element according to an embodiment of the present invention. The implementation of a PHR MAC control element 2300 comprises a Ci field 2310, a type 2 power headroom field 2320, a type 1 power headroom field 2330, a plurality of secondary cell power headroom fields 2340~2360, a first $P_{CMAX,c}$ field 2321 and a secondary cell $P_{CMAX,c}$ fields 2371. The functionality of the PHR MAC control element 2300 is similar to the functionality of the PHR MAC control element 2200 in FIG. 22, thus the detail description is omitted.

Comparing the FIG. 22 with FIG. 23, people having ordinary skill may notice that the type 2 and type 1 power headroom field 2320 and 2330 respectively include a flag 2325 and a flag 2335 instead of the reserve bits therein. Moreover, the secondary cell power headroom field 2340, 2350 and 2360 respectively include flags 2345, 2355 and 2365 instead of the reserve bits therein. The flags (2325, 2335, 2345, 2355 and 2365) are used for respectively indicating whether the following $P_{CMAX,c}$ field exists or not. In this fourteenth embodiment, if the flag in the power headroom field is set to "0", it represents the following $P_{CMAX,c}$ field corresponding to the power headroom field would be included in the PHR MAC control element. If the flag in the power headroom field is set to "1", it represents the $P_{CMAX,c}$ field corresponding to the power headroom field would not be included in the PHR MAC control element.

In FIG. 23, since the flag 2325 is set to "1", the second $P_{CMAX,c}$ field 2231 which originally follows the type 1 power headroom field 2230 in FIG. 22 is not included in the PHR MAC control element 2300. Further, since the flags 2355 and 2365 are set to "1", the $P_{CMAX,c}$ field 2272 which originally follow the power headroom field 2250 is not included in the PHR MAC control element 2300, and the $P_{CMAX,c}$ field 2273 which originally follow the power headroom field 2260 is not included in the PHR MAC control element 2300. However, people having ordinary skill in the art could also design the following $P_{CMAX,c}$ field exist if the flag is "1" according to the suggestion of the present invention. Thus, the present invention is not restricted thereto.

For reducing overhead of $P_{CMAX,c}$ report, in the fourteenth embodiment, several situations that the flag is set to "1" is provided as follow:

1. if the $m^{th}$ $P_{CMAX,c}$ values is the same as the $(m-1)^{th}$ $P_{CMAX,c}$ value, that is to say the $m^{th}$ $P_{CMAX,c}$ field may be unnecessary, the flag of the $m^{th}$ power headroom field would be set to "1" so that the bandwidth usage of PHR MAC control element can be reduced. In the fourteenth embodiment, even the $P_{CMAX,c}$ values corresponding to the type 1 and type 2 power headroom levels corresponds to the primary cell, the $P_{CMAX,c}$ values are usually different, so that the flag 2325 and 2335 will be set to "0"; if $P_{CMAX,c}$ values are the same, the flag 2335 will be set to "1", wherein "m" is a nature number and "m" is smaller than or equal to the number of the power headroom fields corresponding to the activated serving cells and the first $P_{CMAX,c}$ value is always included. In a preferred embodiment of the present invention, it is suggested that at least first $P_{CMAX,c}$ value should be included in the PHR MAC control element. However, people having ordinary skill in the art should know that whether the $P_{CMAX,c}$ value is included in the PHR MAC control element can be optionally designed according to the requirement of the system. The present invention is not restricted thereto.

2. if the $m^{th}$ $P_{CMAX,c}$ values is the same as a predefined value which can be calculated by a predefined equation, the flag of the $m^{th}$ power headroom field would be set to "1", wherein "m" is a nature number and "m" is smaller than or equal to the number of the power headroom fields corresponding to the activated serving cells.

However, people having ordinary skill in the art should know that the flag setting rule may not only comprise the abovementioned two rules so that the present invention is not restricted thereto.

In summary, since the PHR is triggered and reported for all activated serving cells, the complete information of PHR for activated serving cells can be obtained by the eNB. When simultaneous transmission of Physical Uplink Control CHannel (PUCCH) and Physical Uplink Shared CHannel (PUSCH) on the same component carrier occurs, the type 2 power headroom can be also transmitted with the type 1 power headroom so that the eNB can correctly allocate the resources to the user equipment according to the transmitted type 1 and type 2 PHR information. In the other respect of the present invention, a PHR MAC control element is provided to carry the PHR information to the eNB so that the eNB can adaptively allocate the resources to the user equipment and the communication quality is improved.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for performing Power Headroom reporting procedure, adapted for a user equipment, wherein the user equipment is operated in a plurality of serving cells, the method comprising:
   providing a prohibitPHR-Timer;
   determining whether the user equipment has uplink resources for new transmission; and
   when the user equipment has uplink resources for new transmission, the method further comprising:
      triggering a power headroom report when the prohibitPHR-Timer expires or has expired and at least one of a plurality of downlink path loss values has changed more than a PathlossChange threshold since the last transmission of a previous power headroom report, wherein the downlink path loss values respectively corresponds to the serving cells; and
      reporting the power headroom report.

2. The method for performing Power Headroom reporting procedure according to claim 1, the method further comprising:
   providing a periodicPHR-Timer; and
   triggering the power headroom report when the periodicPHR-Timer expires.

3. The method for performing Power Headroom reporting procedure according to claim 1, wherein the step of triggering the power headroom report when the prohibitPHR-Timer expires or has expired and at least one of the downlink path loss values has changed more than a PathlossChange threshold since the last transmission of a previous power headroom report comprises:
   determining whether the prohibitPHR-Timer expires or has expired; and
   when the prohibitPHR-Timer expires or has expired, the method comprising:

obtaining a plurality of previous downlink path loss values corresponding to the serving cells at the last transmission of the previous power headroom report;

obtaining the downlink path loss values corresponding to the serving cells;

respectively calculating a plurality of deviations between downlink path loss values and the previous downlink path loss values corresponding to the serving cells when the user equipment has uplink resources for new transmission;

determining whether the deviations of each serving cell are larger than the PathlossChange threshold; and triggering the power headroom report when at least one of the deviations of its corresponding serving cell is larger than PathlossChange threshold.

4. The method for performing Power Headroom reporting procedure according to claim 1, the method further comprising:

configuring or reconfiguring a power headroom report functionality by an upper layer; and triggering the power headroom report upon configuration or reconfiguration the power headroom report functionality.

5. The method for performing Power Headroom reporting procedure according to claim 1, wherein the plurality of serving cells are a plurality of activated serving cells.

6. The method for performing Power Headroom reporting procedure according to claim 1, wherein the power headroom report comprises a plurality of power headrooms corresponding to the serving cells, the step of triggering the power headroom report comprising:

triggering the power headroom report for all activated serving cells.

7. The method for performing Power Headroom reporting procedure according to claim 1, wherein the step of reporting the power headroom report comprises:

determining whether the user equipment has uplink resources for new transmission;

if the user equipment has uplink resources for new transmission, determining whether the power headroom report has been triggered; and if the power headroom report has been triggered, transmitting the power headroom report.

8. The method for performing Power Headroom reporting procedure according to claim 7, further comprising:

if the user equipment has the uplink resources for new transmission, determining whether it is the first uplink resource for new transmission since the last medium access control reset; and if it is the first uplink resource for new transmission since the last medium access control reset, starting a periodicPHR-Timer.

9. The method for performing Power Headroom reporting procedure according to claim 7, wherein the power headroom report is carried by a power headroom report medium access control-control element, the method for performing the power headroom report further comprising:

determining whether the uplink resources are capable of accommodating the power headroom report media access control-control element plus a sub-header thereof; and if the uplink resources are capable of accommodating the power headroom report media access control-control element plus a sub-header thereof, transmitting the power headroom report media access control-control element.

10. The method for performing Power Headroom reporting procedure according to claim 9, wherein the power headroom report comprises a plurality of power headrooms corresponding to activated serving cells, the method for performing the power headroom report further comprising:

if the uplink resources are capable of accommodating the power headroom report media access control-control element plus the sub-header thereof, obtaining a plurality of power headroom values from a physical layer.

11. The method for performing Power Headroom reporting procedure according to claim 10, the step of transmitting the power headroom report media access control-control element comprising:

instructing a multiplexing and an assembly procedure to generate the power headroom report media access control-control element based on the power headroom values; and transmitting the power headroom report media access control-control element.

12. The method for performing Power Headroom reporting procedure according to claim 9, the step of transmitting the power headroom report media access control-control element further comprising:

starting or restarting a periodicPHR-Timer; and starting or restarting the prohibitPHR-Timer.

13. The method for performing Power Headroom reporting procedure according to claim 9, the step of transmitting the power headroom report media access control-control element further comprising:

cancelling the triggered power headroom report.

14. The method for performing Power Headroom reporting procedure according to claim 9, wherein the power headroom report media access control-control element comprises:

a plurality of power headroom fields, wherein each power headroom field indicates a power headroom level of the corresponding activated serving cell thereof; and a Ci field, comprising a plurality of bits for indicating whether the power headroom fields of the serving cells are reported;

wherein each power headroom level of the corresponding activated serving cell is obtained from a quantized value of the power headroom value of the corresponding activated serving cell.

15. The method for performing Power Headroom reporting procedure according to claim 14, wherein the power headroom report media access control-control element is disposed in a media access control-protocol data unit, and a sub-header of the media access control-protocol data unit comprises a length field to indicate the size of the power headroom report media access control-control element.

16. The method for performing Power Headroom reporting procedure according to claim 14, wherein the power headroom report media access control-control element further comprises:

a plurality of $P_{CMAX,c}$ fields, for respectively indicating $P_{CMAX,c}$ values corresponding to the activated serving cells, wherein the $P_{CMAX,c}$ represents a configured maximum output power corresponding to each serving cell of the user equipment.

17. The method for performing Power Headroom reporting procedure according to claim 16, wherein the $j^{th}$ $P_{CMAX,c}$ field corresponds to the $j^{th}$ power headroom field and the $j^{th}$ power headroom corresponds to the $j^{th}$ activated serving cell, and the $j^{th}$ power headroom field comprises a flag for indicating whether the $j^{th}$ $P_{CMAX,c}$ field exists or not, wherein "j" is a nature number and smaller than or equal to the number of the activated serving cells.

18. The method for performing Power Headroom reporting procedure according to claim 17, wherein the flag for indicating whether the $k^{th}$ $P_{CMAX,c}$ field exists is disabled if the k value is the same as the $(k-1)^{th}$ $P_{CMAX,c}$ value so that the $k^{th}$ $P_{CMAX,c}$ field is removed from the power headroom report media access control-control element, wherein "k" is a nature number and "k" is smaller than or equal to the number of activated serving cells.

19. The method for performing Power Headroom reporting procedure according to claim 17, wherein the flag for indicating whether the $k^{th}$ $P_{CMAX,c}$ field exists is disabled if the $k^{th}$ $P_{CMAX,c}$ value is the same as a predefined value so that the $k^{th}$ $P_{CMAX,c}$ field is removed from the power headroom report media access control-control element, wherein "k" is a nature number and "k" is smaller than or equal to the number of activated serving cells, wherein the predefined value is calculated by a predefined equation.

* * * * *